(12) United States Patent
Teyeb et al.

(10) Patent No.: US 12,063,536 B2
(45) Date of Patent: Aug. 13, 2024

(54) MEASUREMENT CONFIGURATION IN NR-DC

(71) Applicant: Telefonaktiebolaget LM Ericsson (publ), Stockholm (SE)

(72) Inventors: Oumer Teyeb, Solna (SE); Stefan Wager, Espoo (FI); Antonino Orsino, Kirkkonummi (FI); Osman Nuri Can Yilmaz, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 557 days.

(21) Appl. No.: 17/289,809

(22) PCT Filed: Oct. 28, 2019

(86) PCT No.: PCT/SE2019/051060
§ 371 (c)(1),
(2) Date: Apr. 29, 2021

(87) PCT Pub. No.: WO2020/091660
PCT Pub. Date: May 7, 2020

(65) Prior Publication Data
US 2022/0014953 A1    Jan. 13, 2022

Related U.S. Application Data

(60) Provisional application No. 62/752,638, filed on Oct. 30, 2018.

(51) Int. Cl.
*H04W 24/10* (2009.01)
(52) U.S. Cl.
CPC .................. *H04W 24/10* (2013.01)
(58) Field of Classification Search
CPC ..................................... H04W 24/10
See application file for complete search history.

(56) References Cited

U.S. PATENT DOCUMENTS

2016/0183151 A1   6/2016  Wu
2017/0188253 A1   6/2017  Bergstrom et al.
(Continued)

FOREIGN PATENT DOCUMENTS

CN       105940753 A    9/2016
CN       108141803 A    6/2018
(Continued)

OTHER PUBLICATIONS

Introduction of NR-DC, 3GPP TSG-RAN WG2 Meeting #103bis R2-1814893, Chengdu, China, Sep. 8-12, 2018 (Year: 2018).*
(Continued)

*Primary Examiner* — Ayaz R Sheikh
*Assistant Examiner* — David Zhijun Sun
(74) *Attorney, Agent, or Firm* — COATS & BENNETT, PLLC

(57) ABSTRACT

A wireless device operates with dual connectivity to a Master node and a Secondary node, which are both New Radio, NR, nodes. It receives measurement and/or reporting configuration information from a network. It determines whether the received 5 configuration information relates to a MCG or a SCG. Specifically, it is determined that the received configuration information relates to the MCG if the configuration information is received directly within an RRCReconfiguration message received via SRB1, or that the received configuration information relates to the SCG if the configuration information is received directly within an RRCReconfiguration message 0 received via SRB3, or alternatively if the configuration information is received in an RRCReconfiguration message that is embedded within an RRCReconfiguration message received via SRB1.

14 Claims, 15 Drawing Sheets

(56) References Cited

U.S. PATENT DOCUMENTS

| | | | |
|---|---|---|---|
| 2018/0139646 A1 | 5/2018 | Basu Mallick et al. | |
| 2018/0309628 A1* | 10/2018 | Wu | H04W 76/27 |
| 2020/0077288 A1 | 3/2020 | Tsuboi et al. | |
| 2021/0092777 A1 | 3/2021 | Kim et al. | |

FOREIGN PATENT DOCUMENTS

| | | |
|---|---|---|
| WO | 2018174062 A1 | 9/2018 |
| WO | 2018175470 A1 | 9/2018 |

OTHER PUBLICATIONS

Remaining issues of measurement in NR-DC, 3GPP TSG-RAN WG2 Meeting#104 R2-1816570, Spokane, US, Oct. 12-16, 2018 (Year: 2018).*

NR Radio Resource Control (RRC) Protocol specification, 3GPP TS 38.331 version 15.3.0 Release 15 (Year: 2018).*

Ericsson, "Measurement indentities and reporting in case of NR-DC", Change Request, 3GPP TSG-RAN2 Meeting #104, Spokane, USA, Nov. 12, 2018, pp. 1-15, R2-1817590, 3GPP.

Ericsson, "Measurement identities and reporting in NR-DC", 3GPP TSG-RAN WG2#104, Spokane, USA, Nov. 12, 2018, pp. 1-3, Tdoc R2-1817589, 3GPP.

3rd Generation Partnership Project, "3rd Generation Partnership Project; Technical Specification Group Radio Access Network; NR; Radio Resource Control (RRC) Protocol Specification (Release 15)", Technical Specification, 3GPP TS 38.331 V15.3.0, Sep. 1, 2018, pp. 1-445, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 15)", Technical Specification, 3GPP TS 36.331 V15.7.0, Sep. 1, 2019, pp. 1-962, 3GPP.

3rd Generation Partnership Project, "3rd Generation Partnership Project; Technical Specification Group Radio Access Network; Evolved Universal Terrestrial Radio Access (E-UTRA) and NR; Multi-Connectivity; Stage 2 (Release 15)", Technical Specification, 3GPP TS 37.340 V15.7.0, Sep. 1, 2019, pp. 1-70, 3GPP.

3rd Generation Partnership Project, "3rd Generation Partnership Project; Technical Specification Group Radio Access Network; NR; Radio Resource Control (RRC) Protocol Specification (Release 15)", Technical Specification, 3GPP TS 38.331 V15.7.0, Sep. 1, 2019, pp. 1-527, 3GPP.

RAN2 Chairman (Intel), "Chairman Notes", 3GPP TSG-RAN WG2 Meeting #103bis, Chengdu, China, Oct. 8, 2018, pp. 1-136, R2-1815990, 3GPP.

ETSI, "5G; NR; Radio Resource Control (RRC); Protocol Specification (3GPP TS 38.331 Version 15.2.1 Release 15)", Technical Specification, ETSI TS 138 331 V15.2.1, Jun. 1, 2018, pp. 1-302, ETSI.

Rapporteur (ZTE Corporation), "Introduction of NR-DC", 3GPP TSG-RAN WG2 Meeting #103bis, Chengdu, China, Sep. 8, 2018, pp. 1-13, R2-1814893, 3GPP.

CATT: "Summary of [103#52] [NR late drop] MR-DC measurement and gap configuration framework", R2-1813838, 3GPP TSG-RAN WG2 Meeting #103bis, Chengdu, China, Oct. 8-12, 2018.

Ericsson "MN and SN measurement configuration in NR-DC", R2-1814567, 3GPP TSG-RAN2 Meeting #103bis, Chengdu, China, Oct. 8, 2018 to Oct. 12, 2018.

Ericsson, "Handling of transaction identifiers in NR-DC", R2-1814568, 3GPP TSG-RAN WG2#103bis, Chengdu, China, Oct. 8-12, 2018.

Huawei, Hisilicon, "Discussion of Measurement Aspects for NR-NR DC", R2-1814114, 3GPP TSG-RAN WG2#103bis, Chengdu, China, Oct. 8-12, 2018.

* cited by examiner

MEASUREMENT CONFIGURATION IN NR-DC

TECHNICAL FIELD

This relates to Dual Connectivity operation in a cellular wireless network, and in particular to the configuration of measurements and/or reporting.

BACKGROUND

Multi-Carrier Operation

In multicarrier or carrier aggregation (CA) operation a User Equipment (UE) device is able to receive and/or transmit data to more than one serving cell of a cellular wireless communications network. In other words, a CA capable UE can be configured to operate with more than one serving cell. The carrier of each serving cell is generally called a component carrier (CC). In simple words the component carrier (CC) means an individual carrier in a multi-carrier system. The term carrier aggregation (CA) is also (e.g. interchangeably) called "multi-carrier system", "multi-cell operation", "multi-carrier operation", "multi-carrier" transmission and/or reception. This means the CA is used for transmission of signalling and data in the uplink and downlink directions. One of the CCs is the primary component carrier (PCC), or simply primary carrier or even anchor carrier. The remaining ones are called secondary component carriers (SCCs) or simply secondary carriers or even supplementary carriers. The serving cell is interchangeably referred to as the primary cell (PCell) or primary serving cell (PSC). Similarly, the secondary serving cell is interchangeably referred to as the secondary cell (SCell) or secondary serving cell (SSC).

Generally, the primary or anchor CC carries the essential UE specific signalling. The primary CC (aka PCC or PCell) exists in both uplink and downlink directions in CA. When there is a single UL CC, the PCell is obviously on that CC. The network may assign different primary carriers to different UEs operating in the same sector or cell. In DC operation the UE can be served by at least two nodes called master eNB (MeNB) and secondary eNB (SeNB). More generally, in multiple connectivity (aka multi-connectivity) operation the UE can be served by two or more nodes where each node operates or manages one cell group e.g. MeNB, SeNB1, SeNB2 and so on. More specifically in multi-connectivity each node serves or manages at least secondary serving cell belonging to its own cell group. Each cell group contains one or more serving cell. The UE is configured with PCC from both MeNB and SeNB. The PCell from MeNB and SeNB are called the PCell and PSCell respectively. The UE is also configured with one or more SCCs from each of MeNB and SeNB. The corresponding secondary serving cells served by MeNB and SeNB are called SCells. The UE in DC typically has separate TX/RX for each of the connections with MeNB and SeNB. This allows the MeNB and SeNB to independently configure the UE with one or more procedures e.g. radio link monitoring (RLM), DRX cycle etc. on their PCell and PSCell respectively.

In multi-connectivity, all cell groups may contain serving cells of the same Radio Access Technology (RAT) (e.g. Long Term Evolution (LTE)) or different cell groups may contain serving cells of different RATs.

Dual Connectivity in LTE

The Evolved Universal Terrestrial Radio Access Network (E-UTRAN) supports Dual Connectivity (DC) operation whereby a multiple receiver/transmitter (Rx/Tx) UE in RRC_CONNECTED is configured to utilize radio resources provided by two distinct schedulers, located in two eNBs connected via a non-ideal backhaul over the X2 interface (see 3GPP 36.300). eNBs involved in DC for a certain UE may assume two different roles: an eNB may either act as an MN (Master node) or as an SN (Secondary node). In DC a UE is connected to one MN and one SN.

In LTE DC, the radio protocol architecture that a particular bearer uses depends on how the bearer is setup. Three bearer types exist: MCG (Master Cell Group) bearer, SCG (Secondary Cell Group) bearer and split bearers. Radio Resource Control (RRC) is located in the MN and Signalling Radio Bearers (SRBs) are always configured as MCG bearer type and therefore only use the radio resources of the MN.

FIG. 1 shows the form of the User Plane architecture 100 for LTE DC, with a Master Node (MN) 102 and a Secondary Node (SN) 104, and specifically shows a MCG bearer 106, a SCG bearer 108 and a split bearer 110.

Dual Connectivity using both LTE and New Radio (NR), referred to as LTE-NR Dual Connectivity, or as LTE-NR tight interworking, as is currently being discussed for Rel-15.

FIG. 2 shows the form of the User Plane (UP) architecture 200 for LTE-NR tight interworking, with a Master Node (MN) 202 and a Secondary Node (SN) 204, and specifically shows a MCG bearer 206, a SCG bearer 208 and a split bearer 210 from the MN.

FIG. 3 shows the form of the Control Plane (CP) architecture 300 for LTE-NR tight interworking, with a Master Node (MN) 302, a Secondary Node (SN) 304, and a User Equipment (UE) 306.

FIGS. 2 and 3 also show the major changes from the LTE DC architecture shown in FIG. 1, namely:

the introduction of a split bearer 212 from the SN (known as SCG split bearer);

the introduction of a split bearer for RRC the introduction of a direct RRC 308 from the SN (also referred to as SCG SRB or SRB3).

The SN is sometimes referred to as the SgNB (where a gNB is an NR base station), and the MN as the MeNB, in the case where the LTE is the master node and NR is the secondary node. In the other case where NR is the master node and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the uplink, the network configures the UE to use the MCG, SCG or both legs. The terms "leg" and "path" are used interchangeably throughout this document.

The following terminologies are used throughout this text to differentiate different dual connectivity scenarios:

DC: LTE DC (i.e. both MN and SN employ LTE);

EN-DC: LTE-NR dual connectivity where LTE is the master and NR is the secondary;

NGEN-DC: LTE-NR dual connectivity where LTE connected to the 5G core network (5GC) is the master and NR is the secondary;

NE-DC: LTE-NR dual connectivity where NR is the master and LTE is the secondary;

NR-DC (or NR-NR DC): both MN and SN employ NR;

MR-DC (multi-RAT DC): a generic term to describe DC (EN-DC, NGEN-DC, NE-DC, and NR-DC).

In E-UTRAN-NR dual connectivity, the master cell group (MCG) contains at least an E-UTRA PCell while the secondary cell group (SCG) contains at least an NR PSCell. In this example, the master CG and secondary CG are managed by eNB and gNB respectively.

In NR-E-UTRAN dual connectivity, the master cell group contains at least an NR PCell while the secondary cell group contains at least an LTE PSCell. In this example, the master CG and secondary CG are managed by gNB and eNB respectively.

Measurement Coordination in EN-DC, MR-DC, and NR-DC

RRC Structure for EN-DC

The UE receives the RRC connection reconfiguration message from the MN (LTE node) in the case of EN-DC, which can contain an embedded SCG configuration, which is basically the NR RRC Reconfiguration message.

Below is an excerpt of the LTE RRC Reconfiguration message in rel-15 that is used for EN-DC (TS 36.331)

RRCConnectionReconfiguration Message

```
-- ASN1START
RRCConnectionReconfiguration ::=        SEQUENCE {
    rrc-TransactionIdentifier           RRC-TransactionIdentifier,
    criticalExtensions                  CHOICE {
        c1                                          CHOICE{
    rrcConnectionReconfiguration-r8     RRCConnectionReconfiguration-r8-IEs,
    spare7 NULL,
    spare6 NULL, spare5 NULL, spare4 NULL,
    spare3 NULL, spare2 NULL, spare1 NULL
        },
        criticalExtensionsFuture                    SEQUENCE { }
    }
}
RRCConnectionReconfiguration-r8-IEs ::= SEQUENCE {
    measConfig                  MeasConfig              OPTIONAL,       -- Need ON
    mobilityControlInfo         MobilityControlInfo     OPTIONAL,       -- Cond HO
    dedicatedInfoNASList        SEQUENCE (SIZE(1..maxDRB)) OF
                                DedicatedInfoNAS        OPTIONAL, -- Cond nonHO
    radioResourceConfigDedicated        RadioResourceConfigDedicated            OPTIONAL, -- Cond HO-toEUTRA
    securityConfigHO            SecurityConfigHO        OPTIONAL, -- Cond HO-toEPC
    nonCriticalExtension        RRCConnectionReconfiguration-v890-IEs           OPTIONAL
}
<< skipped parts >>
RRCConnectionReconfiguration-v12f0-IEs ::= SEQUENCE {
    scg-Configuration-v12f0     SCG-Configuration-v12f0         OPTIONAL,       --
Cond nonFullConfig
    -- Following field is only for late non-critical extensions from REL-12
    lateNonCriticalExtension    OCTET STRING                                    OPTIONAL,
    nonCriticalExtension        RRCConnectionReconfiguration-v1370-IEs          OPTIONAL
}
<< skipped parts >>
RRCConnectionReconfiguration-v1510-IEs ::= SEQUENCE {
    nr-Config-r15                               CHOICE {
    release                                     NULL,
    setup                                       SEQUENCE {
        endc-ReleaseAndAdd-r15          BOOLEAN,
        nr-SecondaryCellGroupConfig-r15 OCTET STRING            OPTIONAL, -- Need ON
        p-MaxEUTRA-r15                  P-Max                       OPTIONAL        -- Need ON
        }
    }
                                                OPTIONAL,       -- Need ON
    sk-Counter-r15                  INTEGER (0.. 65535)     OPTIONAL,       -- Need ON
    nr-RadioBearerConfig1-r15       OCTET STRING            OPTIONAL,       -- Need ON
    nr-RadioBearerConfig2-r15       OCTET STRING            OPTIONAL,       -- Need ON
    tdm-PatternConfig-r15           CHOICE {
        release                                 NULL,
        setup                                   SEQUENCE {
            subframeAssignment-r15              SubframeAssignment-r15,
            harq-Offset-r15                     INTEGER (0.. 9)
        }
    }
                                                OPTIONAL,       -- Cond
FDD-PCell
    nonCriticalExtension        RRCConnectionReconfiguration-v1530-IEs          OPTIONAL
}
<< skipped parts >>
-- ASN1STOP
```

The measConfig highlighted above contains the measurement configuration from the MN side. The measurement configuration setup and handling for the MCG is specified in 36.331.

The nr-SecondaryCellGroupConfig-r15 contains the NR RRC reconfiguration that could also include the configuration of the SCG measurement configuration. Below is an excerpt for the NR RRC reconfiguration message:
RRCReconfiguration Message

```
-- ASN1START
-- TAG-RRCRECONFIGURATION-START
RRCReconfiguration ::=                       SEQUENCE {
    rrc-TransactionIdentifier                    RRC-TransactionIdentifier,
    criticalExtensions                           CHOICE {
        rrcReconfiguration                           RRCReconfiguration-IEs,
        criticalExtensionsFuture                     SEQUENCE { }
    }
}
RRCReconfiguration-IEs ::=                   SEQUENCE {
    radioBearerConfig                            Radio BearerConfig
OPTIONAL, -- Need M
    secondaryCellGroup                                  OCTET STRING (CONTAINING CellGroupConfig)
OPTIONAL, -- Need M
    measConfig                               MeasConfig
OPTIONAL, -- Need M
    lateNonCriticalExtension                         OCTET STRING
OPTIONAL,
    nonCriticalExtension                         RRCReconfiguration-v1530-IEs
OPTIONAL
}
RRCReconfiguration-v1530-IEs ::=                    SEQUENCE {
    masterCellGroup                          OCTET STRING (CONTAINING CellGroupConfig)
OPTIONAL, -- Need M
    fullConfig                   ENUMERATED {true}
OPTIONAL, -- Cond FullConfig
    dedicatedNAS-MessageList                          SEQUENCE (SIZE(1..maxDRB)) OF
DedicatedNAS-Message                             OPTIONAL, -- Cond nonHO
    masterKeyUpdate                          MasterKeyUpdate
OPTIONAL, -- Cond MasterKeyChange
    dedicatedSSIB1-Delivery                          OCTET STRING (CONTAINING SIB1)
OPTIONAL, -- Need N
    dedicatedSystemInformationDelivery                    OCTET STRING (CONTAINING
SystemInformation)                               OPTIONAL, -- Need N
    otherConfig                  OtherConfig
OPTIONAL, -- Need N
    nonCriticalExtension                         RRCReconfiguration-v15xy-IEs
OPTIONAL
}
<< skipped parts >>
-- TAG-RRCRECONFIGURATION-STOP
-- ASN1STOP
```

The measgap config highlighted above contains the measurement configuration for the NR side. The measurement configuration setup and handling for the SCG is specified in 3GPP TS 38.331 V15.3.0 (hereafter referred to as 38.331). If there is no SRB3, the NR RRC Reconfiguration is sent embedded within the LTE RRC message as shown above (nr-SecondaryCellGroupConfig-r15) and the RRC connection reconfiguration procedure in 36.331 calls the RRC reconfiguration procedure in 38.331 to apply the NR configuration. In case SRB3 is configured, the NR RRC Reconfiguration message can be sent directly to the UE via SRB3, and thus the RRC reconfiguration procedure in 38.331 is directly applied.

As described in TS 38.331, Inter-node messages are used to communicate measurement related information between master and secondary nodes in the case of MR-DC. Inter-node messages are RRC messages that are sent either across the X2-, Xn- or the NG-interface, between two gNBs (in the case of handover and NR dual connectivity, for standalone NR), or between an eNB and a gNB (in the case of EN-DC, NGEN-DC, NE-DC or inter-RAT handover between LTE and NR). We describe here only CG-Config and CG-ConfgInfo which are relevant for this invention (i.e. measurement configurations).

In EN-DC, if SRB3 is configured, the SN can directly configure the UE with the SCG configuration (which could include measurement configurations). If SRB3 is not available/configured, the SN sends the SCG configuration to the MN, the MN embeds it in an MN RRC message, and forwards it to the UE.

The main reason to have distributed measurement configurations were different mobility management of LTE and NR and also, to some extent, latency aspects. Thus, supporting both SRB3 for the SN node (NR) and allowing the SN to configure the measurement separately (without involving the MN) can speed up the measurement configuration and reporting related to the SCG. SRB3, since it uses NR radio, may allow faster transmission than the corresponding LTE SRB. Also, the backhaul link between MN and SN may be congested, which could negatively affect both the measurement reporting and new measurement configurations.

A decentralized measurement configuration (i.e. each node configures the measurements separately) can be beneficial for the case where the MN and SN nodes operate on different RATs with different measurement capabilities and for deployments when there could be a large congestion/delay over Xn.

CG-Config

This message is used to transfer the SCG radio configuration as generated by the SgNB/SeNB to the MeNB/MgNB. The message is sent from a secondary gNB to a master eNB in the case of EN-DC/NGEN-DC; from a secondary eNB to a master gNB in the case of NE-DC and from a secondary gNB to a master gNB in the case of NR-NR DC. The ASN.1 structure of the message is shown below.

CG-Config Info

This message is used by the master eNB or gNB to request the SgNB/SeNB to perform certain actions e.g. to establish, modify or release an SCG. The message is sent from a master eNB to a secondary gNB in the case of EN-DC/NGEN-DC; from a master gNB to a secondary eNB in the case of NE-DC and from a master gNB to a secondary gNB in the case of NR-NR DC. The message may include additional information e.g. to assist the SgNB to set the SCG

```
CG-Config message
CG-Config ::=                    SEQUENCE {
  criticalExtensions                CHOICE {
    c1                                  CHOICE{
      cg-Config                     CG-Config-IEs,
      spare3 NULL, spare2 NULL, spare1 NULL
    },
    criticalExtensionsFuture          SEQUENCE { }
  }
}
CG-Config-IEs ::=              SEQUENCE {
  scg-CellGroupConfig            OCTET STRING (CONTAINING RRCReconfiguration)       OPTIONAL,
  scg-RB-Config                  OCTET STRING (CONTAINING RadioBearerConfig)        OPTIONAL,
  configRestrictModReq           ConfigRestrictModReqSCG            OPTIONAL,
  drx-InfoSCG                    DRX-Info                           OPTIONAL,
  candidateCellInfoListSN        OCTET STRING (CONTAINING MeasResultList2NR)        OPTIONAL,
  measConfigSN                      MeasConfigSN                    OPTIONAL,
  selectedBandCombinationNR         BandCombinationInfoSN           OPTIONAL,
  fr-InfoListSCG                    FR-InfoList                     OPTIONAL,
  candidateServingFreqListNR        CandidateServingFreqListNR      OPTIONAL,
  nonCriticalExtension              SEQUENCE { }                    OPTIONAL
}
MeasConfigSN ::= SEQUENCE {
  measuredFrequenciesSN           SEQUENCE (SIZE (1..maxMeasFreqsSN)) OF NR-FreqInfo       OPTIONAL,
  ...
}
NR-FreqInfo ::= SEQUENCE {
  measuredFrequency               ARFCN-ValueNR                     OPTIONAL,
  ...
}
ConfigRestrictModReqSCG ::=             SEQUENCE {
  requestedBC-MRDC              BandCombinationInfoSN      OPTIONAL,
  requestedP-MaxFR1             P-Max                      OPTIONAL,
  ...
}
BandCombinationIndex ::= INTEGER (1..maxBandComb)
BandCombinationInfoSN ::=        SEQUENCE {
  bandCombinationIndex              BandCombinationIndex,
  requestedFeatureSets              FeatureSetEntryIndex
}
FR-InfoList ::=    SEQUENCE (SIZE (1..maxNrofServingCells-1)) OF FR-Info
FR-Info ::= SEQUENCE {
  servCellIndex    ServCellIndex,
  fr-Type          ENUMERATED {fr1, fr2}
}
CandidateServingFreqListNR ::= SEQUENCE (SIZE (1.. maxFreqIDC-MRDC)) OF ARFCN-ValueNR
-- TAG-CG-CONFIG-STOP
-- ASN1STOP
```

The measConfigSN provides the list of NR frequencies that the SN is configuring the UE to measure, as described in TS 38.331. This information will be used by the MN to decide whether a gap is to be configured/updated.

configuration during SN addition/change. It can also be used by a Central Unit (CU) to request a Distributed Unit (DU) to perform certain actions, e.g. to establish, modify or release an MCG or SCG (only the relevant parts are shown here, please refer to 38.331 for the detailed message structure). allowed total number of measurements are not exceeded) and also for as an assistance information in case a per FR gap

```
CG-ConfigInfo message
CG-ConfigInfo ::=        SEQUENCE {
    criticalExtensions          CHOICE {
        c1                          CHOICE{
            cg-ConfigInfo               CG-ConfigInfo-IEs,
            spare3 NULL, spare2 NULL, spare1 NULL
        },
        criticalExtensionsFuture    SEQUENCE { }
    }
}
CG-ConfigInfo-IEs ::=    SEQUENCE {
    ue-CapabilityInfo           OCTET STRING (CONTAINING UE-CapabilityRAT-
ContainerList)        OPTIONAL,-- Cond SN-Addition
    candidateCellInfoListMN         MeasResultList2NR                   OPTIONAL,
    candidateCellInfoListSN         OCTET STRING (CONTAINING MeasResultList2NR)
OPTIONAL,
    measResultCellListSFTD          MeasResultCellListSFTD              OPTIONAL,
    scgFailureInfo              SEQUENCE {
        failureType                     ENUMERATED { t310-Expiry, randomAccessProblem,
                                            rlc-MaxNumRetx, scg-ChangeFailure,
                                            scg-reconfigFailure,
                                            srb3-IntegrityFailure},
        measResultSCG               OCTET STRING (CONTAINING MeasResultSCG-Failure)
    }
OPTIONAL,
    configRestrictInfo          ConfigRestrictInfoSCG                   OPTIONAL,
    drx-InfoMCG                 DRX-Info                                OPTIONAL,
    measConfigMN                MeasConfigMN                            OPTIONAL,
    sourceConfigSCG                 OCTET STRING (CONTAINING RRCReconfiguration)
OPTIONAL,
    scg-RB-Config               OCTET STRING (CONTAINING RadioBearerConfig)
OPTIONAL,
    mcg-RB-Config               OCTET STRING (CONTAINING RadioBearerConfig)
OPTIONAL,
    mrdc-AssistanceInfo             MRDC-AssistanceInfo                 OPTIONAL,
    nonCriticalExtension        SEQUENCE { }                            OPTIONAL
}
ConfigRestrictInfoSCG ::=        SEQUENCE {
    allowedBC-ListMRDC              BandCombinationInfoList             OPTIONAL,
    powerCoordination-FR1           SEQUENCE {
        p-maxNR-FR1                 P-Max                               OPTIONAL,
        p-maxEUTRA                  P-Max                               OPTIONAL,
        p-maxUE-FR1                 P-Max                               OPTIONAL
    }
OPTIONAL,
    servCellIndexRangeSCG           SEQUENCE {
        lowBound                    ServCellIndex,
        upBound                     ServCellIndex
    }
OPTIONAL, -- Cond SN-Addition
    maxMeasFreqsSCG-NR              INTEGER(1..maxMeasFreqsMN)          OPTIONAL,
    maxMeasIdentitiesSCG-NR         INTEGER(1..maxMeasIdentitiesMN)     OPTIONAL,
    ...
}
MeasConfigMN ::= SEQUENCE {
    measuredFrequenciesMN           SEQUENCE (SIZE (1..maxMeasFreqsMN)) OF
NR-FreqInfo OPTIONAL,
    measGapConfig               SetupRelease { GapConfig }              OPTIONAL,
    gapPurpose                  ENUMERATED {perUE, perFR1}              OPTIONAL,
    ...
}
-- TAG-CG-CONFIG-INFO-STOP
-- ASN1STOP
```

The maxMeasFreqSCG-NR tells the SN the maximum number of NR frequencies that it can configure the UE to measure.

The measConfigMN provides the list of NR frequencies that the MN is configuring the UE to measure and also a measurement gap configuration. The gap configuration can be just for FR1 frequencies or for both FR1 and FR2 (i.e. per UE), depending on the setting of the gapPurpose IE. The list of the NR frequencies is provided to the SN because it may be needed for measurement co-ordination (this information together with maxMeasFreqSCG-NR ensure the UE's is to be set (i.e. so that the SN can determine the proper gap. For example, the SN may configure the UE with a gap configuration with a long gap duration if there are several NR measurements configured on FR2).

One difference between the measConfigSN provided in the CG-Config message and the measConfigMN in the CG-Config Info is that no gap information is provided in the former. This is because even if a per FR gap is to be configured (i.e. FR2 gap is to be set by the SN), the MN can only configure serving cells on FR1 frequencies, and as such it doesn't need to know the FR2 gaps since that doesn't affect the scheduling on FR1 frequencies.

Measurement Gap Configuration in MR-DC

The argument for having lower latency is still relevant in the case of NGEN-DC, but not that important when we have NE-DC (as the MN radio is the one with the highest capacity/lower latency). However, the other arguments are still valid, i.e. NR and LTE have different mobility management and use different RRC protocols. Therefore, the MR-DC measurement framework should be based on the EN-DC solution, where both MN and SN can construct the measurement configuration and receive the measurement reports separately.

For the case of NR-DC, the arguments for having separate measurements (and reports) for both the MN and SN for latency and mobility management purposes still apply (i.e., due to the fact that in this case we use only NR nodes). Thus, a reasonable solution would be to still apply the EN-DC solution for NN-DC and have a sort of harmonization regarding the measurements configuration (and reporting) for all the DC options.

Measurement configuration for MR-DC was discussed in RAN2 #103_bis meeting in October 2018 and the following agreements were made:

Agreements

1: Descriptions on measurement framework in TS 37.340 are applicable to NG-EN DC, NE-DC, and NR-DC, except that SN can only configure measurements embedded in MN RRC message via SRB1 for NE-DC.

2: Descriptions on coordination to avoid exceeding the maximum number of measured layers in TS 37.340 are applicable to NG-EN DC, NE-DC and NR-DC.

3: Descriptions on measurement result exchange between nodes in TS 37.340 are applicable to NG-EN DC, NE-DC and NR-DC, with the modification that measurement results are encoded according to SN's RRC instead of NR RRC when they are provided by MN to SN.

4: Descriptions on measurement gap/gap sharing configuration for EN-DC in TS 37.340 are applicable to NG-EN DC.

5: For NE DC, measurement gap(s)/gap sharing configuration are configured by MN, including per-UE gap, per FR1 gap and per FR2 gap.

6: For NR-DC, measurement gap(s)/gap sharing configuration are configured by MN, including per-UE gap, per FR1 gap and per FR2 gap.

7: Descriptions on measurement gap coordination for EN-DC in TS 37.340 are applicable to NG-EN DC.

8 Measurement gap coordination for NE-DC:
MN→SN: per UE or FR1 gap pattern
SN→MN: gap request (without frequency list)

9: Measurement gap coordination for NR-DC:
MN→SN: the configured per-UE or FR1 or FR2 measurement gap pattern and the gap purpose
SN→MN: a list of SN configured frequencies in FR1 and FR2 measured by the UE RRC Structure for MR-DC The RRC structure for NGEN-DC is similar to the structure shown in the case of EN-DC described above.

The RRC structure for NE-DC and NR-NR DC is still under discussion, and the current proposal under discussion is shown below.

RRCReconfiguration message

```
-- ASN1START
-- TAG-RRCRECONFIGURATION-START
RRCReconfiguration ::=                    SEQUENCE {
   rrc-TransactionIdentifier                 RRC-TransactionIdentifier,
   criticalExtensions                        CHOICE {
      rrcReconfiguration                        RRCReconfiguration-IEs,
      criticalExtensionsFuture                  SEQUENCE { }
   }
}
RRCReconfiguration-IEs ::=                SEQUENCE {
   radioBearerConfig                         RadioBearerConfig                 OPTIONAL, -- Need M
   secondaryCellGroup                        OCTET STRING (CONTAINING CellGroupConfig)
OPTIONAL, -- Need M
   measConfig                                MeasConfig                        OPTIONAL, -- Need M
   lateNonCriticalExtension                  OCTET STRING                      OPTIONAL,
   nonCriticalExtension                      RRCReconfiguration-v1530-IEs      OPTIONAL
}
RRCReconfiguration-v1530-IEs ::=              SEQUENCE {
   masterCellGroup                           OCTET STRING (CONTAINING CellGroupConfig)
OPTIONAL, -- Need M
   fullConfig                                ENUMERATED {true}
OPTIONAL, -- Cond FullConfig
   dedicatedNAS-MessageList                      SEQUENCE (SIZE(1..maxDRB)) OF
DedicatedNAS-Message                             OPTIONAL, -- Cond nonHO
   masterKeyUpdate                           MasterKeyUpdate
OPTIONAL, -- Cond MasterKeyChange
   dedicatedSIB1-Delivery                        OCTET STRING (CONTAINING SIB1)
OPTIONAL, -- Need N
   dedicatedSystemInformationDelivery            OCTET STRING (CONTAINING
SystemInformation)                               OPTIONAL, -- Need N
   otherConfig                               OtherConfig                       OPTIONAL, -- Need N
   nonCriticalExtension                      RRCReconfiguration-v15xy-IEs      OPTIONAL
}
```

```
-- ASN1START
-- TAG-RRCRECONFIGURATION-START
RRCReconfiguration ::=                  SEQUENCE {
    rrc-TransactionIdentifier               RRC-TransactionIdentifier,
    criticalExtensions                      CHOICE {
        rrcReconfiguration                      RRCReconfiguration-IEs,
        criticalExtensionsFuture                SEQUENCE { }
    }
}
RRCReconfiguration-IEs ::=               SEQUENCE {
    radioBearerConfig                       RadioBearerConfig                       OPTIONAL, -- Need M
    secondaryCellGroup                      OCTET STRING (CONTAINING CellGroupConfig)
        OPTIONAL, -- Need M
    measConfig                              MeasConfig                              OPTIONAL, -- Need M
    lateNonCriticalExtension                OCTET STRING                            OPTIONAL,
    nonCriticalExtension                    RRCReconfiguration-v1530-IEs            OPTIONAL
}
RRCReconfiguration-v1530-IEs ::=            SEQUENCE {
    masterCellGroup                         OCTET STRING (CONTAINING CellGroupConfig)
        OPTIONAL, -- Need M
    fullConfig                              ENUMERATED {true}
        OPTIONAL, -- Cond FullConfig
    dedicatedNAS-MessageList                    SEQUENCE (SIZE(1..maxDRB)) OF
        DedicatedNAS-Message                    OPTIONAL, -- Cond
                                            nonHO
    masterKeyUpdate                         MasterKeyUpdate
        OPTIONAL, -- Cond MasterKeyChange
    dedicatedSIB1-Delivery                      OCTET STRING (CONTAINING SIB1)
        OPTIONAL, -- Need N
    dedicatedSystemInformationDelivery          OCTET STRING (CONTAINING
        SystemInformation)                      OPTIONAL, -- Need N
    otherConfig                             OtherConfig
        OPTIONAL, -- Need N
    nonCriticalExtension                    RRCReconfiguration-v15xy-IEs
        OPTIONAL
}
RRCReconfiguration-v15xy-IEs ::=            SEQUENCE {
    mrdc-SecondaryCellGroup                     CHOICE {
        nr-SCG                                  OCTET STRING,
        eutra-SCG                               OCTET STRING
    }
        OPTIONAL, -- Need M
    radioBearerConfig2                      OCTET STRING (CONTAINING RadioBearerConfig)
        OPTIONAL, -- Need M
    sk-Counter                              INTEGER (0..65535)
        OPTIONAL, -- Cond S-KeyChange
    nonCriticalExtension                    SEQUENCE { }
        OPTIONAL
}
-- TAG-RRCRECONFIGURATION-STOP
```

In the case of NE-DC, the eutra-SCG IE is included that contains the LTE configuration for the SCG, while the nr-SCG IE is included in the case of NR-NR DC that contains the NR configuration for the SCG.

Measurement Configuration and Reporting in NR

The measurement configuration in NR includes the following parameters:

1. Measurement objects: A list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single EUTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements, i.e. no (UL, DL) transmissions are scheduled.

The measurement configuration is provided as part of the NR RRCReconfiguration message with the measConfig IE. The definition of this IE and associated IEs is shown below:

MeasConfig Information Element

MeasId Information Element

```
-- ASN1START
-- TAG-MEAS-ID-START
MeasId ::=                    INTEGER (1..maxNrofMeasId)
-- TAG-MEAS-ID-STOP
-- ASN1STOP
```

MeasIdToAddModList Information Element

```
-- ASN1START
-- TAG-MEAS-ID-TO-ADD-MOD-LIST-START
MeasIdToAddModList ::=    SEQUENCE (SIZE (1..maxNrofMeasId)) OF MeasIdToAddMod
MeasIdToAddMod ::=            SEQUENCE {
    measId                    MeasId,
    measObjectId              MeasObjectId,
    reportConfigId            ReportConfigId
}
-- TAG-MEAS-ID-TO-ADD-MOD-LIST-STOP
-- ASN1STOP
```

MeasObjectId Information Element

```
-- ASN1START
-- TAG-MEAS-OBJECT-ID-START
MeasObjectId ::=              INTEGER (1..maxNrofObjectId)
-- TAG-MEAS-OBJECT-ID-STOP
-- ASN1STOP
-- Need M
```

```
-- ASN1START
-- TAG-MEAS-CONFIG-START
MeasConfig ::=              SEQUENCE {
    measObjectToRemoveList        MeasObjectToRemoveList        OPTIONAL, -- Need N
    measObjectToAddModList        MeasObjectToAddModList        OPTIONAL, -- Need N
    reportConfigToRemoveList      ReportConfigToRemoveList      OPTIONAL, -- Need N
    reportConfigToAddModList      ReportConfigToAddModList      OPTIONAL, -- Need N
    measIdToRemoveList            MeasIdToRemoveList            OPTIONAL, --Need N
    measIdToAddModList            MeasIdToAddModList            OPTIONAL, -- Need N
    s-MeasureConfig               CHOICE {
        ssb-RSRP                      RSRP-Range,
        csi-RSRP                      RSRP-Range
    }
OPTIONAL, -- Need M
    quantityConfig                QuantityConfig                OPTIONAL, -- Need M
    measGapConfig                 MeasGapConfig                 OPTIONAL, -- Need M
    measGapSharingConfig          MeasGapSharingConfig          OPTIONAL, -- Need M
    ...
}
MeasObjectToRemoveList ::= SEQUENCE (SIZE (1..maxNrofObjectId)) OF MeasObjectId
MeasIdToRemoveList ::=       SEQUENCE (SIZE (1..maxNrofMeasId)) OF MeasId
ReportConfigToRemoveList ::=SEQUENCE (SIZE (1..maxReportConfig Id)) OF ReportConfigId
-- TAG-MEAS-CONFIG-STOP
-- ASN1STOP
```

MeasObjectToAddModList Information Element

```
-- ASN1START
-- TAG-MEAS-OBJECT-TO-ADD-MOD-LIST-START
MeasObjectToAddModList ::=       SEQUENCE (SIZE (1..maxNrofObjectId)) OF
MeasObjectToAddMod
MeasObjectToAddMod ::=           SEQUENCE {
  measObjectId                     MeasObjectId,
  measObject                       CHOICE {
    measObjectNR                     MeasObjectNR,
    ... ,
    measObjectEUTRA                  MeasObjectEUTRA
  }
}
-- TAG-MEAS-OBJECT-TO-ADD-MOD-LIST-STOP
-- ASN1STOP
```

ReportConfigId Information Element

```
-- ASN1START
-- TAG-REPORT-CONFIG-ID-START
ReportConfigId ::=       INTEGER (1 ..maxReportConfigId)
-- TAG-REPORT-CONFIG-ID-STOP
-- ASN1STOP
```

ReportConfigToAddModList Information Element

```
-- ASN1START
-- TAG-REPORT-CONFIG-TO-ADD-MOD-LIST-START
ReportConfigToAddModList ::=     SEQUENCE (SIZE (1..maxReportConfigId)) OF
ReportConfigToAddMod
ReportConfigToAddMod ::=         SEQUENCE {
  reportConfigId                   ReportConfigId,
  reportConfig                     CHOICE {
    reportConfigNR                   ReportConfigNR,
    ...,
    reportConfigInterRAT             ReportConfigInterRAT
  }
}
```

Apart from the above IEs used to configure measurements, the UE also keeps two variables, VarMeasConfig and VarMeasReportList in relation to measurement configurations and reporting.

VarMeasConfig includes the accumulated configuration of the measurements to be performed by the UE, covering intra-frequency, inter-frequency and inter-RAT mobility related measurements.

VarMeasReportList includes information about the measurements for which the triggering conditions have been met.

VarMeasConfig UE Variable

```
-- ASN1START
-- TAG-VAR-MEAS-CONFIG-START
VarMeasConfig ::=        SEQUENCE {
  -- Measurement identities
  measIdList               MeasIdToAddModList OPTIONAL,
  -- Measurement objects
  measObjectList           MeasObjectToAddMod List OPTIONAL,
  -- Reporting configurations
  reportConfig List        ReportConfigToAddModList
```

-continued

```
                           OPTIONAL,
  -- Other parameters
  quantityConfig           QuantityConfig OPTIONAL,
  s-MeasureConfig          CHOICE {
    ssb-RSRP                 RSRP-Range,
    csi-RSRP                 RSRP-Range
                                       OPTIONAL
  }
}
-- TAG-VAR-MEAS-CONFIG-STOP
-- ASN1STOP
```

VarMeasReportList UE Variable

```
-- ASN1START
-- TAG-VAR-MEAS-REPORT-START
VarMeasReportList ::=            SEQUENCE (SIZE
(1..maxNrofMeasId)) OF VarMeasReport
VarMeasReport ::=                SEQUENCE {
  -- List of measurement that have been triggered
  measId                           MeasId,
  cellsTriggeredList               CellsTriggeredList
OPTIONAL,
  numberOfReportsSent              INTEGER
}
CellsTriggeredList ::=           SEQUENCE (SIZE
     (1..maxNrofCellMeas)) OF CHOICE {
  physCellId                       PhysCellId,
  -- Not needed for EN-DC.
  physCellIdEUTRA                  ENUMERATED
    {ffsTypeAndValue}
}
```

-continued

-- TAG-VAR-MEAS-REPORT-STOP
-- ASN1STOP

There currently exist certain challenges.

In the case of NE-DC, the measurement configuration of the MCG is handled in 38.331 while the measurement configuration of the SCG is handled in 36.331. Since the measurement configurations in these cases are handled in different specs and different IEs are used to hold them, the UE will have no confusion in determining which measurement configuration belongs to the MCG and which belongs to the SCG. That is, when the reporting conditions for a certain measurement configuration is fulfilled, the UE will know whether this measurement belongs to the MN or SN and sends to the measurement report to the MN or SN accordingly.

In the case of NR-DC, both the MCG and the SCG measurement configuration are handled in 38.331. The SCG measurement configuration is passed to the UE via the nr-SCG IE embedded within the MN RRC reconfiguration message or even independently in an NR RRC reconfiguration message in SRB3, if configured. However, the UE will still hold only one measurement configuration, and as such, there could be confusion regarding whether a certain measurement configuration is from the MCG or SCG. This is illustrated by looking at the IEs used for measurement configuration in 38.331 described above.

As can be seen, both the MN and SN (regardless whether SRB3 is used for the SN or not), will include the measurements that they want to include by using the different IEs above. Thus, there will be a confusion on which measurement configurations are related to the MCG and which to the SCG, and when the reporting conditions for a measurement are fulfilled, the UE will have a problem in deciding to which node to send the measurement. Also, if the same measurement ID is used by the MN and SN, there can be additional problems such as the MN's measurement configuration overwriting the SN's configuration for certain measurements (or vice versa) or receiving the MN removing an SCG measurement configuration by mistake (or vice versa).

SUMMARY

According to a first aspect of the present invention, there is provided a method performed by a wireless device, wherein the wireless device is operating with dual connectivity to a Master node and a Secondary node, and wherein the Master node and the Secondary node are both New Radio, NR, nodes. The method comprises receiving measurement and/or reporting configuration information from a network. The wireless device then determines, based on the received measurement and/or reporting configuration information, whether the received measurement and/or reporting configuration information relates to a Master Cell Group or a Secondary Cell Group. Determining whether the received measurement and/or reporting configuration information relates to the Master Cell Group or the Secondary Cell Group comprises: determining that the received measurement and/or reporting configuration information relates to the Master Cell Group if the measurement and/or reporting configuration information is received directly within an RRCReconfiguration message received via SRB1, or determining that the received measurement and/or reporting configuration information relates to the Secondary Cell Group if the measurement and/or reporting configuration information is received directly within an RRCReconfiguration message received via SRB3, or alternatively if the measurement and/or reporting configuration information is received in an RRCReconfiguration message that is embedded within an RRCReconfiguration message received via SRB1. The wireless device then performs measurements and/or reports measurement results based on the determination as to whether the received measurement and/or reporting configuration information relates to the Master Cell Group or the Secondary Cell Group.

The method may comprise reporting measurement results to either the Master node or the Secondary node, based on the determination as to whether received reporting configuration information relates to the Master Cell Group or the Secondary Cell Group.

The method may comprise receiving a configuration information from the network indicating a range of one or more of measurement identities, measurement object identities, and/or reporting configuration that are to be associated with the Secondary Cell Group.

The received measurement and/or reporting configuration may comprise at least one of: first information elements and/or fields containing measurement and/or reporting configuration information relating to a Master Cell Group; and second information elements and/or fields containing measurement and/or reporting configuration information relating to a Secondary Cell Group.

The method may comprise reporting measurement results information relating to a Master Cell Group in first information elements and/or fields, or reporting measurement results relating to a Secondary Cell Group in second information elements different from the first information elements.

The method may comprise, if SRB3 is configured, reporting measurement results relating to the Secondary Cell Group via SRB3.

The method may comprise, if SRB3 is not configured, reporting measurement results relating to the Secondary Cell Group in a Radio Resource Control message via the Master Cell Group.

According to a second aspect, there is provided a method of operation of a Master node, wherein the Master node is serving a user equipment, UE, wherein the UE is operating with dual connectivity to the Master node and a Secondary node, and wherein the Master node is part of a Master Cell Group. The method comprises transmitting the measurement and/or reporting configuration in information elements and/or fields available for measurement and/or reporting configuration information relating to the Master Cell Group.

The method may comprise transmitting the measurement and/or reporting configuration information directly within an RRCReconfiguration message via SRB1.

The method may further comprise receiving a measurement report from the UE.

According to a third aspect, there is provided a method of operation of a Secondary node, wherein the Secondary node is serving a user equipment, UE, wherein the UE is operating with dual connectivity to the Secondary node and a Master node, and wherein the Secondary node is part of a Secondary Cell Group. The method comprises transmitting the measurement and/or reporting configuration in information elements and/or fields available for measurement and/or reporting configuration information relating to the Secondary Cell Group.

The method may comprise transmitting the measurement and/or reporting configuration information in an RRCReconfiguration message embedded within an RRCReconfiguration message via SRB1.

The method may comprise transmitting the measurement and/or reporting configuration information within an RRCReconfiguration message via SRB3.

The method may further comprise receiving a measurement report from the UE.

According to a further aspect, there is provided a wireless device, the wireless device comprising processing circuitry configured to perform any of the steps of any method according to the first aspect; and power supply circuitry configured to supply power to the wireless device.

According to a further aspect, there is provided a network node, for example a base station, comprising processing circuitry configured to perform any of the steps of any method according to the second or third aspect; and power supply circuitry configured to supply power to the network node.

Thus, there is disclosed a robust way to configure measurements and measurement gaps in NE-DC and NR-NR DC scenarios.

Further, there is disclosed a robust way to configure shared configuration parameters for a UE operating in DC.

Specifically, the methods disclosed herein in some embodiments help to make it possible to configure NR-DC measurements in an unambiguous way, making implementation easy and making it possible for both the MN and SN to configure measurements independently, and also for the UE to be able to report the measurements to the correct node that configured the measurements.

In some embodiments, the mechanisms help to ensure that the MN will not inadvertently instruct the UE to modify/delete measurement and reporting configuration associated with the SN (and vice versa).

In some embodiments, the mechanisms help to ensure that the UE will report the measurements to the appropriate node (i.e. configurations made by the MN will result in reporting to the MN when the triggering conditions are fulfilled, and configurations made by the SN will result in reporting to the SN when the triggering conditions are fulfilled).

In some embodiments, the mechanisms help to ensure that the MN or SN will not inadvertently configure the UE with measurement/reporting configurations that exceed the UE's capability (which could have resulted in a reconfiguration failure, forcing the UE to re-establish the connection).

In some embodiments, the mechanisms help to ensure that the UE will be prevented from associating measurement/reporting configurations incorrectly (e.g. a measurement identity from the MN with a reporting configuration from the SN). Otherwise, the UE may have associated a certain measurement object to a reporting configuration that it was not meant to be associated with, thereby reporting the measurement at the wrong time/situation. The receiving node (MN or SN) would incorrectly assume that the proper reporting conditions were made and can initiate actions such as handover, secondary node change/release, which could lead to un-optimal behaviour (e.g. the UE being connected to an MN or SN that did not have serving cells with the best radio conditions to the UE), or even failure (and subsequently SCG failure or even re-establishment) in the worst cases. Similarly, depending on the implementation, if the network received a measurement report and finds out that the measurement report is not in accordance with the configuration that it has sent (e.g. information included in the report was not according to the configuration sent to the UE), it could end up releasing the UE connection (which would result in the UE to re-establish the connection).

According to an embodiment of a first group, there is provided a method performed by a wireless device, wherein the wireless device is operating with dual connectivity to a first network node and a second network node, and wherein the first network node and the second network node are both New Radio, NR, nodes, the method comprising:
- receiving measurement and/or reporting configuration information from a network;
- determining at the wireless device, based on the received measurement and/or reporting configuration information, whether the received measurement and/or reporting configuration information relates to the first network node or the second network node; and
- performing measurements and/or reporting measurement results based on the determination as to whether the received measurement and/or reporting configuration information relates to the first network node or the second network node.

The method may comprise determining whether the received measurement and/or reporting configuration information relates to the first network node or the second network node, based on how the measurement and/or reporting configuration information is received.

The method may comprise determining that the received measurement and/or reporting configuration information relates to a master network node if the measurement and/or reporting configuration information is received directly within an RRCReconfiguration message in a master node signaling radio bearer, SRB1.

The method may comprise determining that the received measurement and/or reporting configuration information relates to a secondary network node if the measurement and/or reporting configuration information is received in an RRCReconfiguration message from a secondary network node that is embedded within an RRCReconfiguration message from the master network node.

The method may comprise determining that the received measurement and/or reporting configuration information relates to a secondary network node if the measurement and/or reporting configuration information is received directly within an RRCReconfiguration message in a secondary node signaling radio bearer, SRB3.

The method may comprise reporting measurement results to either the first network node or the second network node, based on the determination as to whether received reporting configuration information relates to the first network node or the second network node.

The method may comprise receiving a configuration information from the network indicating a range of one or more of measurement identities, measurement object identities, and/or reporting configuration that are to be associated with the secondary cell group.

The method may comprise determining whether the received measurement and/or reporting configuration information relates to the first network node or the second network node, based on an explicit information contained in the received measurement and/or reporting configuration information.

The method may comprise receiving in each received measurement and/or reporting configuration information indicating whether a specified identity is coupled with the first network node or the second network node.

The method may comprise receiving in each received measurement and/or reporting configuration information indicating whether a specified identity is coupled with a master cell group or a secondary cell group.

The specified identity may be referred to in a configuration field.

The method may comprise receiving in a received measurement configuration information indicating whether the measurement and/or reporting configuration is associated with a master cell group or a secondary cell group.

The received measurement and/or reporting configuration may comprise at least one of:
  first information elements and/or fields containing measurement and/or reporting configuration information relating to a master cell group; and
  second information elements and/or fields containing measurement and/or reporting configuration information relating to a secondary cell group.

The method may comprise reporting measurement results information relating to a master cell group in first information elements and/or fields, and reporting measurement results relating to a secondary cell group in second information elements different from the first information elements.

The method may comprise, if SRB3 is configured, reporting measurement results relating to the secondary cell group in SRB3.

The method may comprise, if SRB3 is not configured, reporting measurement results relating to the secondary cell group in a Radio Resource Control message via the master cell group.

The method may further comprise:
  providing user data; and
  forwarding the user data to a host computer via the transmission to the base station.

According to an embodiment of a second group, there is provided a method performed by a first network node, wherein the first network node is serving a user equipment, UE, wherein the UE is operating with dual connectivity to the first network node and a second network node, the method comprising:
  co-ordinating with the second network node so that the measurement/reporting configuration of the UE is consistent.

In the method, a consistent measurement/reporting configuration at the UE may mean that the first network node and the second network node will use different identities when configuring one or more of measurement identities, measurement object identities and/or reporting configuration identities.

The first network node may be a master node and the second node may be a secondary node, the method comprising:
  communicating to the second network node a range of measurement identities that the second node can configure.

The first network node may be a secondary node and the second network node may be a master node, the method comprising:
  receiving from the second network node a communication indicating a range of measurement identities that the first node can configure.

The first network node and the second network node may both be New Radio, NR, nodes.

According to another embodiment of the second group, there is provided a method of operation of a network node, comprising:
  sending measurement and/or reporting configuration information to a user equipment, UE, wherein the UE is operating with dual connectivity to a first network node and a second network node, and wherein the first network node and the second network node are both New Radio, NR, nodes;
  wherein the measurement and/or reporting configuration information indicates explicitly whether the measurement and/or reporting configuration information relates to the first network node or the second network node.

The method may comprise sending in each transmitted measurement/reporting configuration information indicating whether a specified identity is coupled with the first network node or the second network node.

The method may comprise sending in each transmitted measurement/reporting configuration information indicating whether a specified identity is coupled with a master cell group or a secondary cell group.

Said specified identity may be referred to in a configuration field.

The method may comprise sending in each transmitted measurement configuration information indicating whether the measurement configuration is associated with a master cell group or a secondary cell group.

According to another embodiment of the second group, there is provided a method of operation of a first network node, wherein the first network node is serving a user equipment, UE, wherein the UE is operating with dual connectivity to the first network node and a second network node, and wherein the first network node is part of a master cell group, the method comprising:
  transmitting the measurement and/or reporting configuration in information elements and/or fields available for measurement and/or reporting configuration information relating to the master cell group.

According to another embodiment of the second group, there is provided a method of operation of a first network node, wherein the first network node is serving a user equipment, UE, wherein the UE is operating with dual connectivity to the first network node and a second network node, and wherein the first network node is part of a secondary cell group, the method comprising:
  transmitting the measurement and/or reporting configuration in information elements and/or fields available for measurement and/or reporting configuration information relating to the secondary cell group.

The method of the embodiments of the second group may further comprise:
  obtaining user data; and
  forwarding the user data to a host computer or a wireless device.

According to an embodiment of a third group, there is provided a wireless device, the wireless device comprising:
  processing circuitry configured to perform any of the steps of any of the embodiments of the first group; and
  power supply circuitry configured to supply power to the wireless device.

According to another embodiment of the third group, there is provided a network node, for example a base station, comprising:
  processing circuitry configured to perform any of the steps of any of the embodiments of the second group;
  power supply circuitry configured to supply power to the network node.

According to another embodiment of the third group, there is provided a user equipment (UE), the UE comprising:
  an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the embodiments of the first group;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

According to another embodiment of the third group, there is provided a communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the embodiments of the second group.

The communication system may further include the base station.

The communication system may further include the UE, wherein the UE is configured to communicate with the base station.

In the communication system:

the processing circuitry of the host computer may be configured to execute a host application, thereby providing the user data; and the UE may comprise processing circuitry configured to execute a client application associated with the host application.

According to another embodiment of the third group, there is provided a method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the embodiments of the second group.

The method may further comprise, at the base station, transmitting the user data.

The user data may be provided at the host computer by executing a host application, the method further comprising, at the UE, executing a client application associated with the host application.

According to another embodiment of the third group, there is provided a user equipment (UE) configured to communicate with a base station, the UE comprising a radio interface and processing circuitry configured to perform said method.

According to another embodiment of the third group, there is provided a communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the embodiments of the first group.

The cellular network may further include a base station configured to communicate with the UE.

In the communication system:

the processing circuitry of the host computer may be configured to execute a host application, thereby providing the user data; and the UE's processing circuitry may be configured to execute a client application associated with the host application.

According to another embodiment of the third group, there is provided a method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the embodiments of the first group.

The method may further comprise, at the UE, receiving the user data from the base station.

According to another embodiment of the third group, there is provided a communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the embodiments of the first group.

The communication system may further include the UE.

The communication system may further include the base station, wherein the base station comprises a radio interface configured to communicate with the UE and a communication interface configured to forward to the host computer the user data carried by a transmission from the UE to the base station.

In the communication system:

the processing circuitry of the host computer may be configured to execute a host application; and the UE's processing circuitry may be configured to execute a client application associated with the host application, thereby providing the user data.

In the communication system:

the processing circuitry of the host computer may be configured to execute a host application, thereby providing request data; and the UE's processing circuitry may be configured to execute a client application associated with the host application, thereby providing the user data in response to the request data.

According to another embodiment of the third group, there is provided a method implemented in a communication system including a host computer, a base station and a user equipment (UE), the method comprising:

at the host computer, receiving user data transmitted to the base station from the UE, wherein the UE performs any of the steps of any of the embodiments of the first group.

The method may further comprising, at the UE, providing the user data to the base station.

The method may further comprise:
at the UE, executing a client application, thereby providing the user data to be transmitted; and
at the host computer, executing a host application associated with the client application.

The method may further comprise:
at the UE, executing a client application; and
at the UE, receiving input data to the client application, the input data being provided at the host computer by executing a host application associated with the client application,
wherein the user data to be transmitted is provided by the client application in response to the input data.

According to another embodiment of the third group, there is provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the embodiments of the second group.

The communication system may further include the base station.

The communication system may further include the UE, wherein the UE is configured to communicate with the base station.

In the communication system:
the processing circuitry of the host computer may be configured to execute a host application;
the UE may be configured to execute a client application associated with the host application, thereby providing the user data to be received by the host computer.

According to another embodiment of the third group, there is provided a method implemented in a communication system including a host computer, a base station and a user equipment (UE), the method comprising:
at the host computer, receiving, from the base station, user data originating from a transmission which the base station has received from the UE, wherein the UE performs any of the steps of any of the embodiments of the first group.

The method may further comprise, at the base station, receiving the user data from the UE.

The method may further comprise, at the base station, initiating a transmission of the received user data to the host computer.

BRIEF DESCRIPTION OF THE DRAWINGS

For a better understanding of the present invention, and to show how it may be put into effect, reference will now be made, by way of example, to the accompanying drawings, in which:—

DETAILED DESCRIPTION

Figure 1:
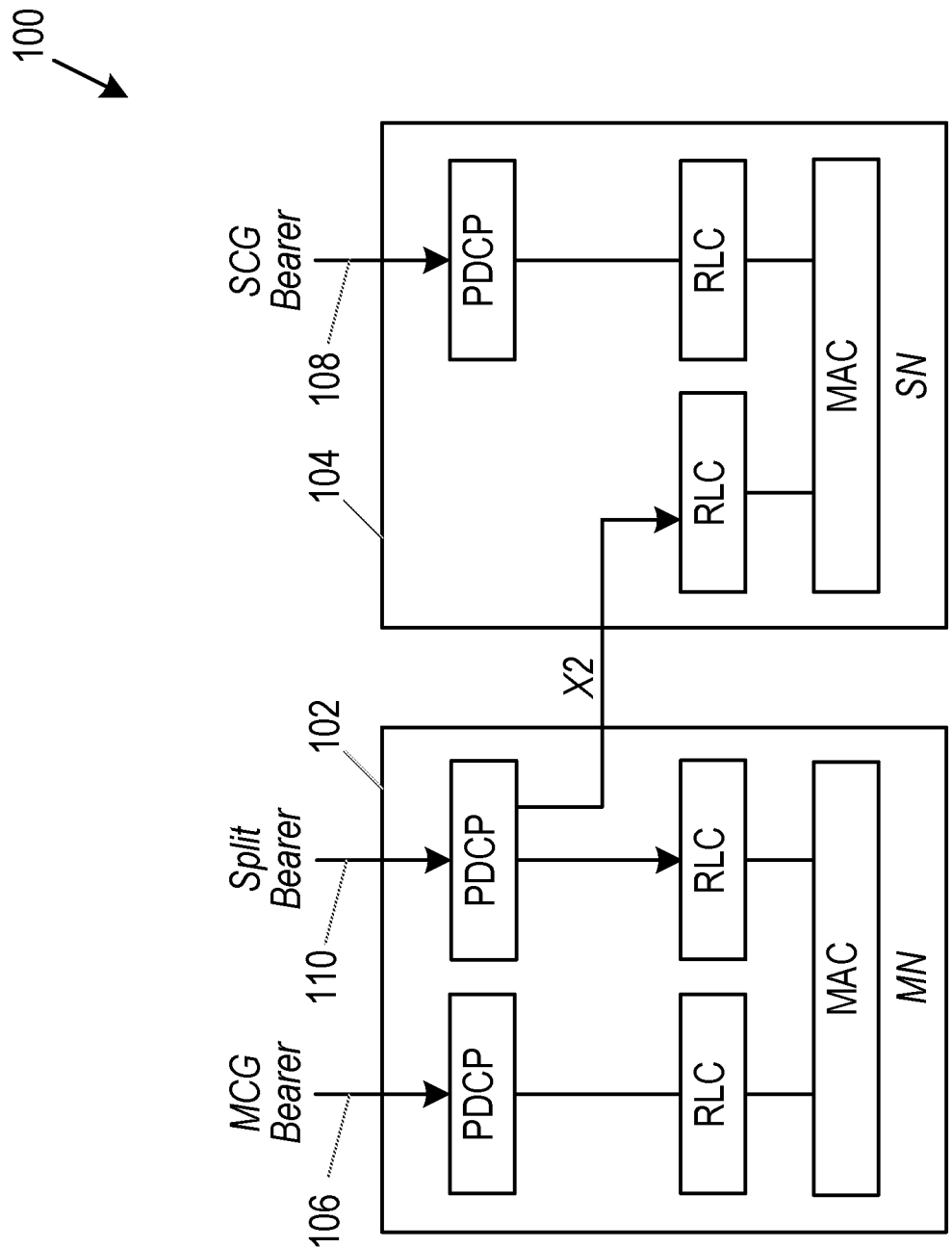
FIG. 1 illustrates dual connectivity in a radio network.
Figure 2:
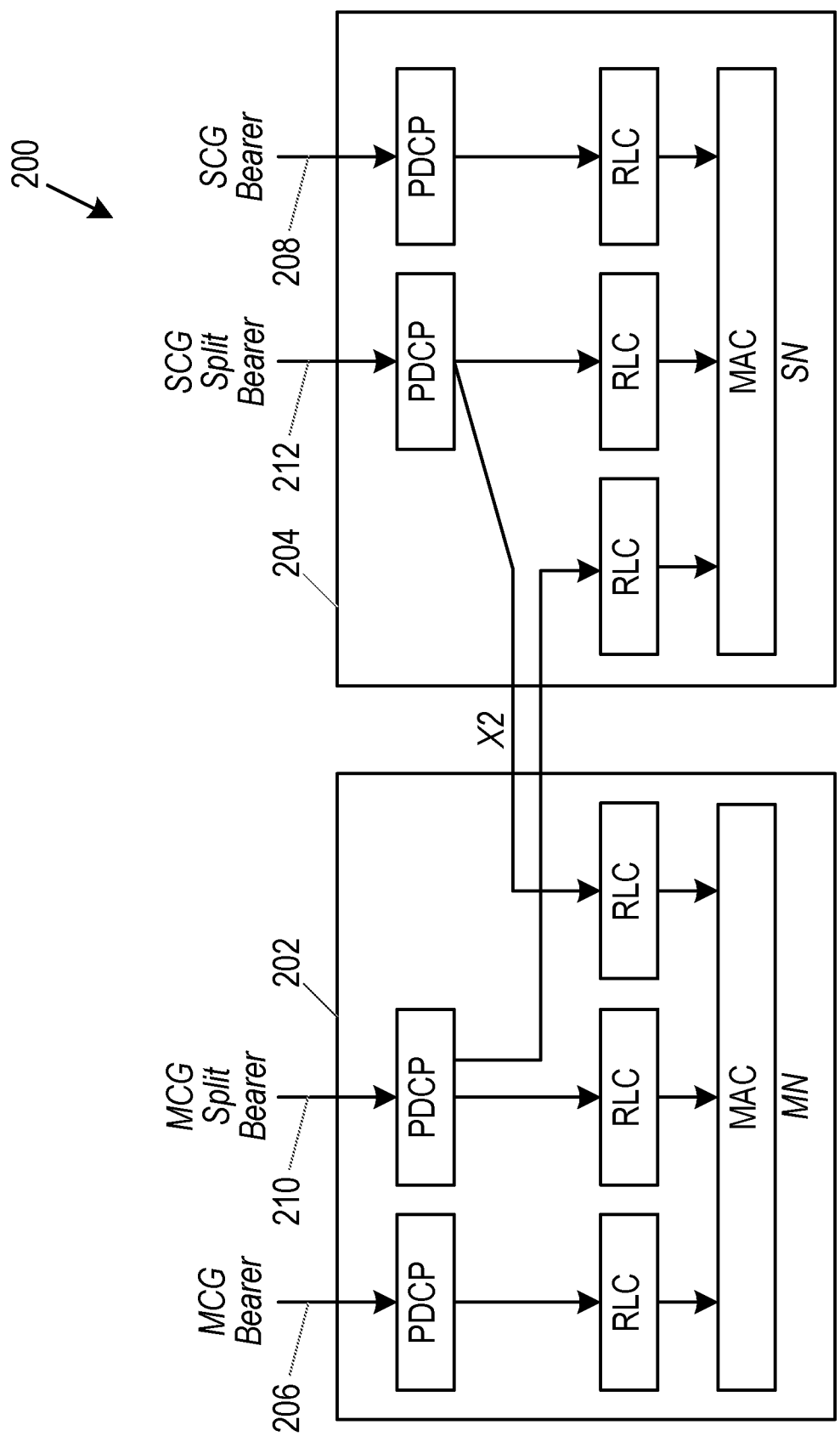
FIG. 2 shows the User Plane architecture for tight interworking.
Figure 3:
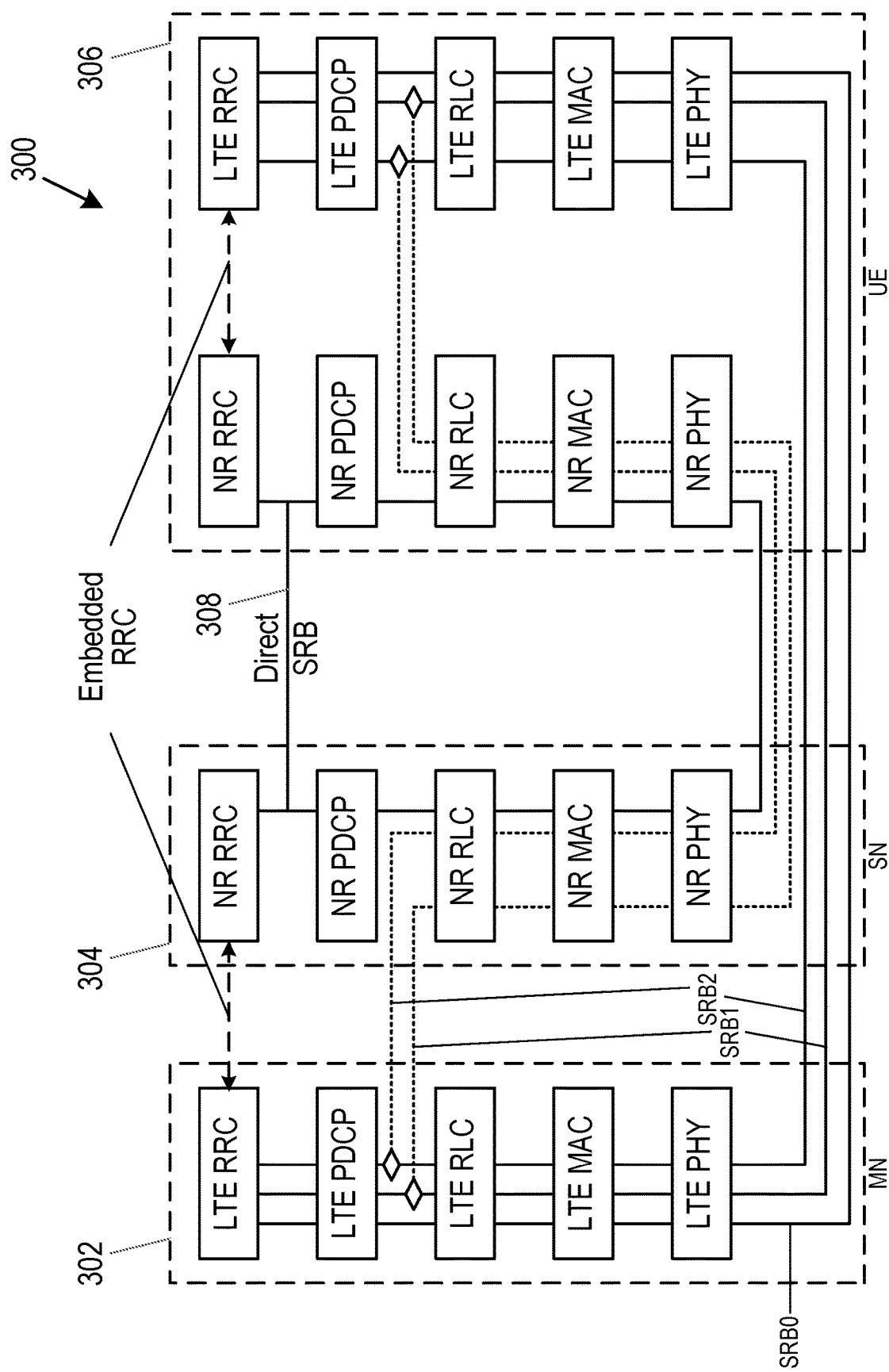
FIG. 3 shows the Control Plane architecture for tight interworking.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Methods are disclosed herein to make unambiguous the measurement configuration and reporting in NR-DC.

As described in more detail below, several mechanisms are proposed, of which some are UE related and some are network related.

Amongst the UE related mechanisms, there are implicit mechanisms (where no explicit signalling from the network is required), and explicit mechanisms where new explicit signalling from the network is required).

One implicit mechanism is a mechanism at the UE to distinguish the association of the measurement and/or reporting configuration to the MN or SN, based on how the measurement and/or reporting configuration is received (e.g. SRB1, embedded within SRB1, SRB3, etc. . . . ), and store this information in the UE measurement variables. The UE later uses this information to report the measurement results to the appropriate node when measurements are triggered.

In one explicit mechanism, the current measurement and/or reporting configuration field and/or IEs and/or UE parameters are reused but new IEs are used to communicate to the UE the range of measurement/reporting related identities (e.g. measurement identities and/or measurement object identities and/or reporting configuration identities, etc.) that are associated with the MN, and those that are associated with the SN.

In another explicit mechanism, new IEs and/or fields are introduced in already existing measurement configuration fields and/or IEs and/or UE parameters to distinguish if the measurement and/or reporting configuration is coupled with the MN or the SN.

In another explicit mechanism, new IEs and/or fields and/or UE parameters are introduced to store measurement configuration and reporting information that is related to SCG measurement and reporting configurations.

Network related mechanisms include introducing new IEs (e.g. in the inter-node messages between the MN and the SN) to co-ordinate the measurement related identities (for example, measurement identities, measurement object identities, or reporting configuration identities, etc.) to be used in the MN and SN, to ensure that identities associated with the MN will not be mistaken to be associated with the SN (and vice versa).

Some of the embodiments contemplated herein will now be described more fully. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Note:

In the following, the terms MN and MCG are used interchangeably, and the terms SN and SCG are used interchangeably.

Embodiment a

A single measurement configuration/report field (e.g., measConfig) is signalled over the air interface and used jointly to handle MCG and SCG measurement configurations by the UE (as in standalone NR). The UE determines whether the measurement/reporting configuration is related to the MCG or SCG depending on how the measurement configuration is received. Specifically:
1. if the configuration is received via SRB1 (i.e. directly within the RRCReconfiguration message), then the configuration is associated with the MN
2. if the configuration is received embedded within SRB1 (i.e. in an RRCReconfiguration message from the MN that includes an RRCReconfiguration message from the SN) or if the configuration was received via SRB3, then the configuration is associated with the SN The UE includes this information (i.e. whether the configuration is associated with the MN or SN) in an IE within the UE measurement configuration parameters (e.g., varMeasConfig, varMeasReportList), and this information is used to decide to where (i.e. MN or SN) the measurement should be reported to when the measurement triggering conditions are met.

A co-ordination between the MN and SN allows the UE to be configured with consistent measurement configurations (e.g. the same measurement identities are not reused). This can be done either via implementation (e.g. the SN is pre-configured with the identities it can use) or dynamically via inter-node messages (e.g. the range of measurement identities that the SN can configure are communicated to the SN via the CG-ConfigInfo inter-node message).

Figure 4:
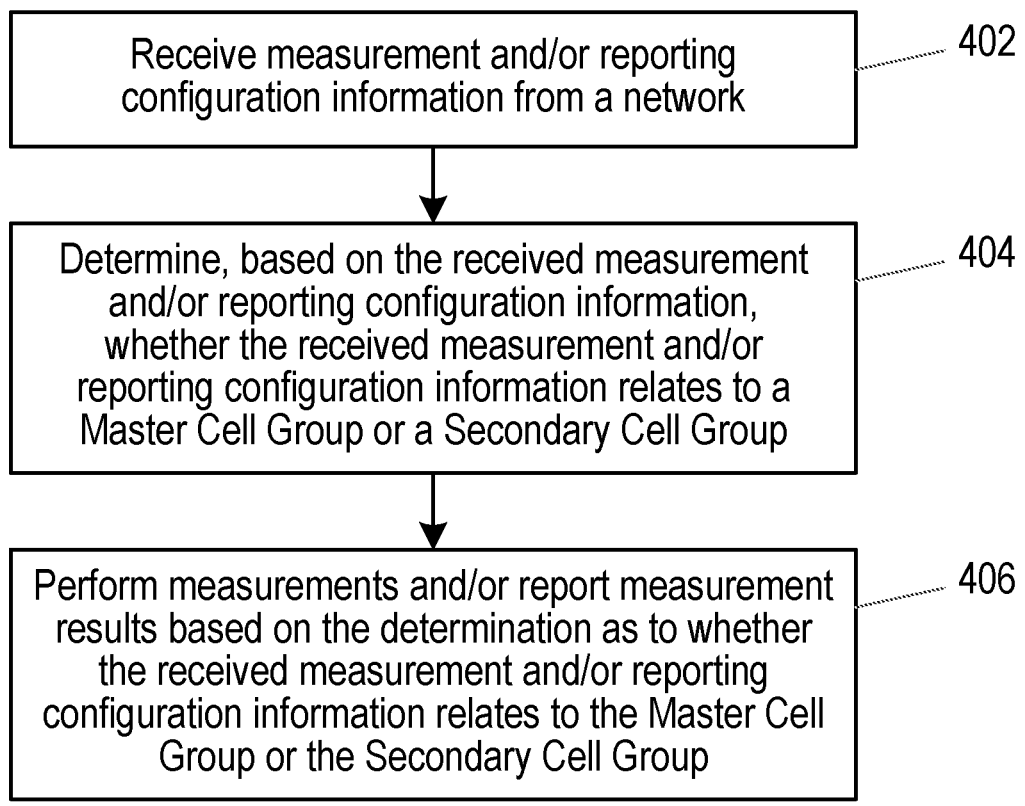
FIG. 4 is a flow chart, illustrating a method performed in a wireless device.

FIG. 4 is a flow chart illustrating a method performed by the UE in accordance with Embodiment a.

Specifically, FIG. 4 illustrates a method performed by a wireless device, wherein the wireless device is operating with dual connectivity to a Master node and a Secondary node, and wherein the Master node and the Secondary node are both New Radio, NR, nodes.

At step 402, the wireless device receives measurement and/or reporting configuration information from a network.

At step 404, the wireless device determines, based on the received measurement and/or reporting configuration information, whether the received measurement and/or reporting configuration information relates to a Master Cell Group or a Secondary Cell Group.

Determining whether the received measurement and/or reporting configuration information relates to the Master Cell Group or the Secondary Cell Group may comprise:
   determining that the received measurement and/or reporting configuration information relates to the Master Cell Group if the measurement and/or reporting configuration information is received directly within an RRCReconfiguration message received via SRB1, or
   determining that the received measurement and/or reporting configuration information relates to the Secondary Cell Group if the measurement and/or reporting configuration information is received directly within an RRCReconfiguration message received via SRB3, or alternatively if the measurement and/or reporting configuration information is received in an RRCReconfiguration message that is embedded within an RRCReconfiguration message received via SRB1.

At step 406, the method continues with the wireless device performing measurements and/or reporting measurement results based on the determination as to whether the received measurement and/or reporting configuration information relates to the Master Cell Group or the Secondary Cell Group.

Figure 5:
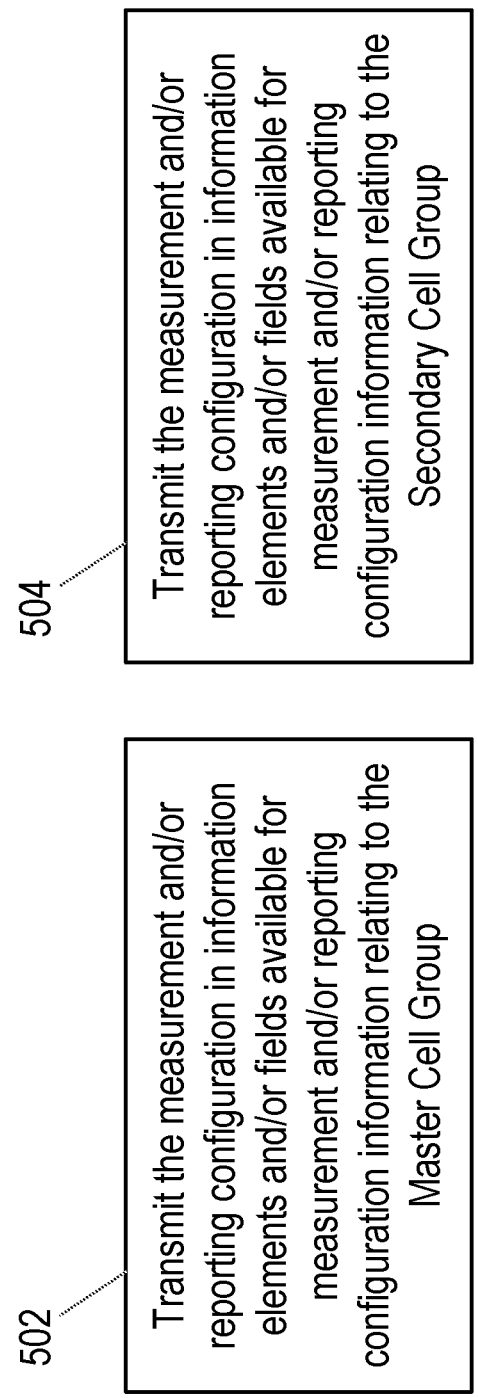
FIG. 5 is a flow chart, illustrating a method performed in a network node.

FIG. 5 illustrates a method performed by a network node in accordance with Embodiment a.

If the network node is acting as a Master node, at step 502 it transmits the measurement and/or reporting configuration in information elements and/or fields available for measurement and/or reporting configuration information relating to the Master Cell Group. For example, it may transmit the measurement and/or reporting configuration information relating to the Master Cell Group directly within an RRCReconfiguration message via SRB1.

Alternatively, if the network node is acting as a Secondary node, at step 504 it transmits the measurement and/or reporting configuration in information elements and/or fields available for measurement and/or reporting configuration information relating to the Secondary Cell Group. For example, it may transmit the measurement and/or reporting configuration information relating to the Secondary Cell Group directly within an RRCReconfiguration message via SRB3, or alternatively may transmit the measurement and/or reporting configuration information in an RRCReconfiguration message that is embedded within an RRCReconfiguration message via SRB1.

Embodiment b

As in embodiment a, there is a single measurement configuration/report field (e.g., measConfig) signalled over the air interface and used jointly to handle MCG and SCG measurement configurations by the UE. However, unlike embodiment a, the network also signals per measurement configuration (e.g., measId field) whether the identity referred in the configuration field is coupled with MCG or SCG. For this, a new field/IE is required to signal this information.

Embodiment c

As in embodiments a and b, there is a single measurement configuration/report field (e.g., measConfig) signalled over the air interface and used jointly to handle MCG and SCG measurement configurations by the UE. However, in this case, the network explicitly indicates to which cell group the measurement configuration is associated with.

Embodiment d

Measurement configuration/report fields and UE variables—both signalled over the air interface and stored in the UE e.g., measConfig and varMeasConfig—are separately defined for MCG and SCG. This also means that the measurement identities can be independently used. In this case, for instance, MeasConfig, VarMeasConfig and ReportingConfig information elements (IEs) do not necessarily needed to be modified, but the corresponding IEs for the SCG (e.g. MeasConfig-SCG, VarMeasConfig-SCG, etc.) will be defined.

Implementation Examples

Different example implementations of the embodiments are given. In some places where the current procedures in 38.331 are to be reused, we have indicated so using <<skipped parts>>, for the sake of brevity.

Embodiment a

Implicit Handling of MCG and SCG Measurement/Reporting Configurations (Implementation Option 1)
UE Aspects
The varMeasConfig IE is extended to include a field to distinguish if the configuration is associated with the MN or SN.
VarMeasConfig UE Variable

```
-- ASN1START
-- TAG-VAR-MEAS-CONFIG-START
VarMeasConfig ::=            SEQUENCE {
    -- Measurement identities
    measIdList               MeasIdToAddModList OPTIONAL,
    -- Measurement objects
    measObjectList           MeasObjectToAddMod
        List OPTIONAL,
    -- Reporting configurations
    reportConfig List        ReportConfigToAddModList
        OPTIONAL,
    -- Other parameters
    quantityConfig           QuantityConfig OPTIONAL,
    s-MeasureConfig               CHOICE {
        ssb-RSRP                  RSRP-Range,
        csi-RSRP                  RSRP-Range
    }                             OPTIONAL
}
VarMeasConfig- r15xy ::=     {
    cellGroupMeasConfig      SEQUENCE (SIZE
    (1..maxSecondaryCellGroups) OF CellGroupMeasConfig
}
CellGroupMeasConfig: =       SEQUENCE {
    cellGroup                CellGroupId OPTIONAL, -- Need M,
    measIdList               MeasIdToAddModList OPTIONAL,
    -- Measurement objects
    measObjectList           MeasObjectToAddMod
        List OPTIONAL,
    -- Reporting configurations
    reportConfig List        ReportConfigToAddModList
        OPTIONAL,
    -- Other parameters
    quantityConfig           QuantityConfig OPTIONAL,
    s-MeasureConfig               CHOICE {
        ssb-RSRP                  RSRP-Range,
        csi-RSRP                  RSRP-Range
    }                             OPTIONAL
}
-- TAG-VAR-MEAS-CONFIG-STOP
-- ASN1STOP
```

VarMeasConfig Field Descriptions
cellGroup
Set to CellGroup which configured this measurement configuration. A value of 0 indicates the MCG, while a value of 1 indicates the SCG.
NOTE: In the above, the quantityConfig and s-MeasureConfig are per cell group. However, in some sub-embodiments, it is possible for either or both to be shared among cell groups (i.e. to be directly under the VarMeasConfig-r15xy IE, rather than under the CellGroupMeasConfig.

The procedural changes required for embodiment a are illustrated in the examples below:
Measurement Configuration
Measurement Identity Addition/Modification
The network applies the procedure as follows:
  configure a measId only if the corresponding measurement object, the corresponding reporting configuration and the corresponding quantity configuration, are configured.
The UE shall:
1> for each measId included in the received measIdToAddModList:
  2> if an entry with the matching measId exists in the measIdList within the VarMeasConfig (within each cellGroupMeasConfig):
    3> replace the entry with the value received for this measId;
  2> else:
    3> if the measurement configuration that triggered this procedure was received in SRB1:
      4> if there is no cellGroupMeasConfig in the varMeasConfig with cellGroup equal to 0
        5> add a new cellGroupMeasConfig entry in varMeasConfig and set the cellGroup to 0;
      4> add a new entry for this measId within the VarMeasConfig in the cellGroupMeasConfig that has cellGroup value of 0;
    3> else if the measurement configuration that triggered this procedure was received in SRB3 or in SCG RRCReconfiguration message embedded in SRB1:
      4> if there is no cellGroupMeasConfig in the varMeasConfig with cellGroup equal to 1
        5> add a new cellGroupMeasConfig entry in varMeasConfig and set the cellGroup to 1;
      4> add a new entry for this measId within the VarMeasConfig in the cellGroupMeasConfig that has cellGroup value of 1;
  2> remove the measurement reporting entry for this measId from the VarMeasReportList, if included;
  2> stop the periodical reporting timer and reset the associated information (e.g. timeToTrigger) for this measId.

2> if the reportType is set to reportCGI in the reportConfig associated with this measId;
3> if the measObject associated with this measId concerns E-UTRA:
4> start timer T321 with the timer value set to X seconds for this measId;
3> if the measObject associated with this measId concerns NR:
4> start timer T321 with the timer value set to Y seconds for this measId;

Measurement Object Addition/Modification

The UE shall:
1> for each measObjectId included in the received measObjectToAddModList:
2> if an entry with the matching measObjectId exists in the measObjectList within the VarMeasConfig, for this entry (within each cellGroupMeasConfig):
<<skipped parts>>
2> else:
3> if the measurement configuration that triggered this procedure was received in SRB1:
4> if there is no cellGroupMeasConfig in the varMeasConfig with cellGroup equal to 0
5> add a new cellGroupMeasConfig entry in varMeasConfig and set the cellGroup to 0;
4> add a new entry for the received measObject to the measObjectList within VarMeasConfig in the cellGroupMeasConfig that has cellGroup value of 0;
3> else if the measurement configuration that triggered this procedure was received in SRB3 or in SCG RRCReconfiguration message embedded in SRB1:
4> if there is no cellGroupMeasConfig in the varMeasConfig with cellGroup equal to 1
5> add a new cellGroupMeasConfig entry in varMeasConfig and set the cellGroup to 1;
4> add a new entry for the received measObject to the measObjectList within VarMeasConfig in the cellGroupMeasConfig that has cellGroup value of 1;

5.5.2.7 Reporting Configuration Addition/Modification

The UE shall:
1> for each reportConfigId included in the received reportConfigToAddModList:
2> if an entry with the matching reportConfigId exists in the reportConfigList within the VarMeasConfig, for this entry:
3> reconfigure the entry with the value received for this reportConfig;
3> for each measId associated with this reportConfigId included in the measIdList within the VarMeasConfig, if any:
4> remove the measurement reporting entry for this measId from the VarMeasReportList, if included;
4> stop the periodical reporting timer and reset the associated information (e.g. timeToTrigger) for this measId;
2> else:
3> if the measurement configuration that triggered this procedure was received in SRB1:
4> if there is no cellGroupMeasConfig in the varMeasConfig with cellGroup equal to 0
5> add a new cellGroupMeasConfig entry in varMeasConfig and set the cellGroup to 0;
4> add a new entry for the received reportConfig to the reportConfigList within the VarMeasConfig in the cellGroupMeasConfig that has cellGroup value of 0;
3> else if the measurement configuration that triggered this procedure was received in SRB3 or in SCG RRCReconfiguration message embedded in SRB1:
4> if there is no cellGroupMeasConfig in the varMeasConfig with cellGroup equal to 1
5> add a new cellGroupMeasConfig entry in varMeasConfig and set the cellGroup to 1;
4> add a new entry for the received reportConfig to the reportConfigList within the VarMeasConfig in the cellGroupMeasConfig that has cellGroup value of 1;

Measurement Reporting

General

<<skipped parts>>
1> if the UE is configured with EN-DC:
2> if SRB3 is configured:
3> submit the MeasurementReport message via SRB3 to lower layers for transmission, upon which the procedure ends;
2> else:
3> submit the MeasurementReport message via the EUTRA MCG embedded in E-UTRA RRC message ULInformationTransferMRDC as specified in TS 36.331.
1> else if the measID of the measResult included in the MeasurementReport message is associated with the SCG:
2> if SRB3 is configured:
3> submit the MeasurementReport message via SRB3 to lower layers for transmission, upon which the procedure ends;
2> else:
3> submit the MeasurementReport message via the MCG embedded in RRC message ULInformationTransferMRDC.
1> else:
2> submit the MeasurementReport message to lower layers for transmission, upon which the procedure ends.

NOTE: The UE determines whether the measID is associated with the MCG or SCG based on to which cell group the measID belongs to in the varMeasConfig.

Network Aspects

A co-ordination between the MN and SN allows the UE to be configured with consistent measurement configurations (e.g. the same measurement identities are not reused). This can be done either via implementation (e.g. the SN is pre-configured with the identities it can use) or dynamically via inter-node messages (e.g. the range of measurement identities that the SN can configure are communicated to the SN via the CG-ConfigInfo inter-node message).

Via Implementation:

In this case, no inter-node messages are required, and MN and SN can be pre-configured with which measurement identities they can use. When it comes to the measurement objects and reportingConfigurations, the same principle can be kept. However, it is possible for the MN and SN to be able to share the same measurement objects and reporting configurations (as one measurement object or reporting configuration can be associated in several measurement configuration (please refer to the measIdToAddModList IE). However, here care should be taken that the measurement object or reporting configuration set by the MN is not changed by the SN, without notifying the MN, or vice versa.

Via Inter-Node Messages:

Here, we describe how the inter-node messages are enhanced to support such co-ordination:

```
CG-Config Info ::=                  SEQUENCE {
    criticalExtensions                  CHOICE {
        c1                              CHOICE{
            cg-Config Info              CG-Config Info-1Es,
            spare3 NULL, spare2 NULL, spare1 NULL
        },
        criticalExtensionsFuture        SEQUENCE { }
    }
}
CG-ConfigInfo-IEs ::=               SEQUENCE {
    ue-CapabilityInfo                   OCTET STRING
        (CONTAINING UE-CapabilityRAT-
ContainerList)                      OPTIONAL, -- Cond SN-Addition
    candidateCellInfoListMN             MeasResultList2NR
OPTIONAL,
    candidateCellInfoListSN             OCTET STRING
        (CONTAINING MeasResultList2NR)
OPTIONAL,
    measResultCellListSFTD              MeasResult
            CellListSFTD
OPTIONAL,
    scgFailureInfo                      SEQUENCE {
        failureType                     ENUMERATED
            {t310-Expiry, randomAccessProblem,
                                        rlc-MaxNumRetx,
            scg-ChangeFailure,
                                        scg-reconfigFailure,
                                        srb3-
            IntegrityFailure},
        measResultSCG                   OCTET STRING
            (CONTAINING MeasResultSCG-Failure)
    }
OPTIONAL,
    configRestrictInfo                  ConfigRestrictInfoSCG
OPTIONAL,
    drx-InfoMCG                         DRX-Info
OPTIONAL,
    measConfigMN                        MeasConfigMN
OPTIONAL,
    sourceConfigSCG                     OCTET STRING
        (CONTAINING RRCReconfiguration)
OPTIONAL,
    scg-RB-Config                       OCTET STRING
        (CONTAINING RadioBearerConfig)
OPTIONAL,
    mcg-RB-Config                       OCTET STRING
        (CONTAINING RadioBearerConfig)
OPTIONAL,
    mrdc-Assistance Info                MRDC-Assistance Info
OPTIONAL,
    nonCriticalExtension                SEQUENCE { }
OPTIONAL
}
ConfigRestrictInfoSCG ::=            SEQUENCE {
    allowedBC-ListMRDC                  BandCombinationInfoList
OPTIONAL,
    powerCoordination-FR1               SEQUENCE {
        p-maxNR-FR1                     P-Max
OPTIONAL,
        p-maxEUTRA                      P-Max
OPTIONAL,
        p-maxUE-FR1                     P-Max
OPTIONAL
    }
OPTIONAL,
    servCellIndexRangeSCG               SEQUENCE {
        lowBound                        ServCellIndex,
        upBound                         ServCellIndex
    }
OPTIONAL, -- Cond SN-Addition
    measIdIndexRangeSCG                 SEQUENCE {
        lowBound                        MeasId,
        upBound                         MeasId
    }
OPTIONAL, -- Cond SN-Addition
    measObjectIdIndexRangeSCG           SEQUENCE {
        lowBound                        MeasObjectId,
        upBound                         MeasObjectId
    }
OPTIONAL, -- Cond SN-Addition
    reportConfigIdIndexRangeSCG         SEQUENCE {
        lowBound                        ReportConfigId,
        upBound                         ReportConfigId
    }
OPTIONAL, -- Cond SN-Addition
    maxMeasFreqsSCG-NR                  INTEGER
        (1..maxMeasFreqsMN)
OPTIONAL,
    maxMeasIdentitiesSCG-NR             INTEGER
        (1..maxMeasIdentitiesMN)
OPTIONAL,
    ...
}
MeasConfigMN ::=                    SEQUENCE {
    measuredFrequenciesMN               SEQUENCE (SIZE
        (1..maxMeasFreqsMN)) OF NR-
FreqInfo OPTIONAL,
    measGapConfig                       SetupRelease { GapConfig }
OPTIONAL,
    gapPurpose                          ENUMERATED
        {perUE, perFR1}
OPTIONAL,
    ...
}
-- TAG-CG-CONFIG-INFO-STOP
-- ASN1STOP
```

The measIdIndexRangeSCG tells the SN that it can set measurement identities that are between the lowBound and upBound values, thereby making sure that the MN and SN will never configure measurements with the same identities.

The measObjectIdIndexRangeSCG tells the SN that it can set measurement object identities that are between the lowBound and upBound values, thereby making sure that the MN and SN will never configure measurement objects with the same identities.

The reportConfigIdIndexRangeSCG tells the SN that it can set reporting configuration identities that are between the lowBound and upBound values, thereby making sure that the MN and SN will never configure measurements with the same identities.

Note that, as above, it is possible to reuse measurement object and reporting configurations across cell groups. To support this, the CG-Config Info (and CG-Config, which is sent from the SN to the MN) could be enhanced to make it possible to exchange these configurations between the nodes (when they are configured first, or modified by the node which configured them first or the other node).

NOTE: In the above, the measId, measObject and reportConfig are all co-ordinated between the MN and SN via the measIdIndexRangeSCG, measObjectIDIndexRangeSCG and reportConfigIdIndexRangeSCG, respectively.

However, in some sub-embodiments, only one or the two of these may need co-ordination and are thus used in the inter-node messages. (For example, if the measurement configuration always sends a measConfig that has the measID, measObject, and reportingConfig in the same message, with the proper association of each to the other).

Embodiment a

Implicit Handling of MCG and SCG Measurement/Reporting Configurations (Implementation Option 2)

The varMeasConfig IE is extended to include a field to distinguish if the configuration is associated with the MN or SN.

VarMeasConfig UE Variable

```
-- ASN1START
-- TAG-VAR-MEAS-CONFIG-START
VarMeasConfig ::=                SEQUENCE {
    -- Measurement identities
    measIdList                   MeasIdToAddModList OPTIONAL,
    -- Measurement objects
    measObjectList               MeasObjectToAddMod
        List OPTIONAL,
    -- Reporting configurations
    reportConfig List            ReportConfigToAddModList
        OPTIONAL,
    -- Other parameters
    quantityConfig               QuantityConfig OPTIONAL,
    s-MeasureConfig              CHOICE {
        ssb-RSRP                     RSRP-Range,
        csi-RSRP                     RSRP-Range
    }                                OPTIONAL
}
VarMeasConfig-r15xy ::=          SEQUENCE {
    -- Measurement identities
        scgMeasIdList            SEQUENCE (SIZE
    (1..maxNrofMeasId)) OF MeasId
OPTIONAL,
        scgMeasObjectIdList      SEQUENCE (SIZE
    (1.. maxNrofObjectId) OF
MeasIdObjectId                   OPTIONAL,
        scgReportConfigIdList    SEQUENCE (SIZE
    (1.. maxNrofReportConfigId) OF
ReportConfigId                   OPTIONAL,
        scgMeasIdList            SEQUENCE (SIZE
    (1..maxNrofMeasId)) OF MeasId
OPTIONAL,
    measIdList                   MeasIdToAddModList
        OPTIONAL,
    -- Measurement objects
    measObjectList               MeasObjectToAddMod
        List OPTIONAL,
    -- Reporting configurations
    reportConfig List            ReportConfigToAddModList
OPTIONAL,
    -- Other parameters
    quantityConfig               QuantityConfig OPTIONAL,
    s-MeasureConfig              CHOICE {
        ssb-RSRP                     RSRP-Range,
        csi-RSRP                     RSRP-Range
    }                                OPTIONAL
}
-- TAG-VAR-MEAS-CONFIG-STOP
-- ASN1STOP
```

The procedural changes required for embodiment a are illustrated in the examples below:

NOTE: In the above, the SCG ranges for measId, measObject and reportConfig are all indicated to the UE via the scgMeasIdList, scgMeasObjectIdList and scgReportConfigIdList, respectively. However, in some sub embodiments, only one or the two of these may need to be indicated (for example, if the measurement configuration always sends a measconfig that has the measID, measObject, and reportingConfig in the same message, with the proper association of each to the other).

Measurement Configuration
Measurement Identity Addition/Modification
　The network applies the procedure as follows:
　　configure a measId only if the corresponding measurement object, the corresponding reporting configuration and the corresponding quantity configuration, are configured.
　The UE shall:
　　1> for each measId included in the received measIdToAddModList:
　　　2> if an entry with the matching measId exists in the measIdList within the VarMeasConfig:
　　　　3> replace the entry with the value received for this measId;
　　　2> else:
　　　　3> add a new entry for this measId within the VarMeasConfig;
　　　　3> if the measurement configuration that triggered this procedure was received in SRB3 or in SCG RRCReconfiguration message embedded in SRB1:
　　　　　5> add the measId in the scgMeasIdList within the varMeasConfig;
　　　2> remove the measurement reporting entry for this measId from the VarMeasReportList, if included;
　　　2> stop the periodical reporting timer and reset the associated information (e.g. timeToTrigger) for this measId.
　　　2> if the reportType is set to reportCGI in the reportConfig associated with this measId;
　　　　3> if the measObject associated with this measId concerns E-UTRA:
　　　　　4> start timer T321 with the timer value set to X seconds for this measId;
　　　　3> if the measObject associated with this measId concerns NR:
　　　　　4> start timer T321 with the timer value set to Y seconds for this measId;
Measurement Object Addition/Modification
　The UE shall:
　　1> for each measObjectId included in the received measObjectToAddModList:
　　　2> if an entry with the matching measObjectId exists in the measObjectList within the VarMeasConfig, for this entry:
　　　<<skipped parts>>
　　　2> else:
　　　　3> add a new entry for the received measObject to the measObjectList within VarMeasConfig;
　　　　3> if the measurement configuration that triggered this procedure was received in SRB3 or in SCG RRCReconfiguration message embedded in SRB1:
　　　　　5> add the measObjectId in the scgMeasObjectIdList within the varMeasConfig;
Reporting Configuration Addition/Modification
　The UE shall:
　　1> for each reportConfigId included in the received reportConfigToAddModList:
　　　2> if an entry with the matching reportConfigId exists in the reportConfigList within the VarMeasConfig, for this entry:
　　　　3> reconfigure the entry with the value received for this reportConfig;
　　　　3> for each measId associated with this reportConfigId included in the measIdList within the VarMeasConfig, if any:
　　　　　4> remove the measurement reporting entry for this measId from the VarMeasReportList, if included;
　　　　　4> stop the periodical reporting timer and reset the associated information (e.g. timeToTrigger) for this measId;
　　　2> else:
　　　　3> add a new entry for the received reportConfig to the reportConfigList within the VarMeasConfig.
　　　　3> if the measurement configuration that triggered this procedure was received in SRB3 or in SCG RRCReconfiguration message embedded in SRB1:
　　　　　5> add the reportConfigId in the scgReportConfigIdList within the varMeasConfig;

Measurement Reporting
General
<<skipped parts>>
1> if the UE is configured with EN-DC:
2> if SRB3 is configured:
3> submit the MeasurementReport message via SRB3 to lower layers for transmission, upon which the procedure ends;
2> else:
3> submit the MeasurementReport message via the EUTRA MCG embedded in E-UTRA RRC message ULInformationTransferMRDC as specified in TS 36.331.
1> else if the measID of the measResult included in the MeasurementReport message is associated with the SCG (i.e. the measID is included in the scgMeasIdList in varMeasConfig):
2> if SRB3 is configured:
3> submit the MeasurementReport message via SRB3 to lower layers for transmission, upon which the procedure ends;
2> else:
3> submit the MeasurementReport message via the MCG embedded in RRC message ULInformationTransferMRDC.
1> else:
2> submit the MeasurementReport message to lower layers for transmission, upon which the procedure ends.

The same mechanisms as in the "Network Aspects" section above can be reused to co-ordinate the identities between the MN and SN.

Embodiment b

Explicit Handling Via Signaled Ranges of Identities for the Cell Groups.

The range of identities that are associated with the MCG or SCG can be communicated in several messages/IEs/fields. For example:

A field is added in the RRCReconfiguration message

An IE is introduced in the CellGroupConfig message

An IE is introduced in the measConfig IE

An example is shown below where the CellGroupConfig is enhanced:

CellGroupConfig Information Element

```
-- ASN1START
-- TAG-CELL-GROUP-CONFIG-START
-- Configuration of one Cell-Group:
CellGroupConfig ::=                    SEQUENCE {
    cellGroupId                        CellGroupId,
    rlc-BearerToAddModList             SEQUENCE
             (SIZE(1..maxLC-ID)) OF RLC-
BearerConfig                           OPTIONAL, -- Need N
    rlc-BearerToReleaseList            SEQUENCE
             (SIZE(1..maxLC-ID)) OF
LogicalChannelIdentity                 OPTIONAL, -- Need N
    mac-CellGroupConfig                MAC-
             CellGroupConfig
OPTIONAL, -- Need M
    physicalCellGroupConfig            PhysicalCellGroupConfig
OPTIONAL, -- Need M
    spCellConfig                       SpCellConfig
OPTIONAL, -- Need M
    sCellToAddModList                  SEQUENCE
             (SIZE (1..maxNrofSCells)) OF
SCellConfig                            OPTIONAL, -- Need N
    sCellToReleaseList                 SEQUENCE
             (SIZE (1..maxNrofSCells)) OF
SCellIndex                             OPTIONAL, -- Need N
    ...,
    [[
    reportUplinkTxDirectCurrent-v1530  ENUMERATED
             {true}
OPTIONAL, -- Cond BWP-Reconfig
    ]]
    [[
    measIdIndexRangeSCG                SEQUENCE {
        lowBound                       MeasId,
        upBound                        MeasId
    }
OPTIONAL,
    measObjectIdIndexRangeSCG          SEQUENCE {
        lowBound                       MeasObjectId,
        upBound                        MeasObjectId
    }
OPTIONAL,
    reportConfigIdIndexRangeSCG        SEQUENCE {
        lowBound                       ReportConfigId,
        upBound                        ReportConfigId
    }
OPTIONAL,
    ]]
}
-- Serving cell specific MAC and PHY parameters for a SpCell:
SpCellConfig ::=                       SEQUENCE {
    servCellIndex                      ServCellIndex
OPTIONAL, -- Cond SCG
    reconfigurationWithSync            Reconfiguration
             WithSync
OPTIONAL, -- Cond ReconfWithSync
    rlf-TimersAndConstants             SetupRelease { RLF-
             TimersAndConstants }
OPTIONAL, -- Need M
    rlmInSyncOutOfSyncThreshold        ENUMERATED
             {n1}OPTIONAL,
-- Need S
    spCellConfig Dedicated             ServingCellConfig
OPTIONAL, -- Need M
    ...
}
ReconfigurationWithSync ::=            SEQUENCE {
    spCellConfigCommon                 ServingCell
             ConfigCommon
OPTIONAL, -- Need M
    newUE-Identity                     RNTI-Value,
    t304                               ENUMERATED
             {ms50, ms100, ms150, ms200,
ms500, ms1000, ms2000, ms10000},
    rach-ConfigDedicated               CHOICE {
        uplink                         RACH-ConfigDedicated,
        supplementaryUplink            RACH-
             Config Dedicated
    }
OPTIONAL, -- Need N
    ...,
    [[
    smtc                               SSB-MTC
OPTIONAL -- Need S
    ]]
}
SCellConfig ::=                        SEQUENCE {
    sCellIndex                         SCellIndex,
    sCellConfigCommon                  ServingCell
             ConfigCommon
```

```
OPTIONAL, -- Cond SCellAdd
  sCellConfig Dedicated          ServingCellConfig
OPTIONAL, -- Cond SCellAddMod
  ...,
  [[
  smtc                           SSB-MTC
OPTIONAL -- Need S
  ]]
}
-- TAG-CELL-GROUP-CONFIG-STOP
-- ASN1STOP
```

NOTE: In the above, the SCG ranges for measId, measObject and reportConfig are all indicated to the UE via the measIdIndexRangeSCG, measObjectIDIndexRangeSCG and reportConfigIdIndexRangeSCG, respectively. However, in some sub-embodiments, only one or the two of these may need to be indicated (for example, if the measurement configuration always sends a measconfig that has the measID, measObject, and reportingConfig in the same message, with the proper association of each to the other).

Also, it should be noted that the usage of the cellGroup configuration to indicate this is just one possible realization of this embodiment. Other possibilities are including these SCG range IEs in the measConfig, in the RRCConnectionReconfiguration message, etc.

The procedural changes required for embodiment b are illustrated in the examples below:

Measurement Reporting
General
  <<skipped parts>>
  1> if the UE is configured with EN-DC:
    2> if SRB3 is configured:
      3> submit the MeasurementReport message via SRB3 to lower layers for transmission, upon which the procedure ends;
    2> else:
      3> submit the MeasurementReport message via the EUTRA MCG embedded in E-UTRA RRC message ULInformationTransferMRDC as specified in TS 36.331.
  1> else if measID of the measResult included in the MeasurementReport message is associated with the SCG:
    2> if SRB3 is configured:
      3> submit the MeasurementReport message via SRB3 to lower layers for transmission, upon which the procedure ends;
    2> else:
      3> submit the MeasurementReport message via the MCG embedded in RRC message ULInformationTransferMRDC.
  1> else:
    2> submit the MeasurementReport message to lower layers for transmission, upon which the procedure ends.

NOTE: The UE determines whether the measID is associated with the MCG or SCG based on the received ranges of measurement identities in the cell group configuration.

Network Aspects

The same mechanisms as in the "Network Aspects" section above can be reused to co-ordinate the identities between the MN and SN.

Embodiment c

Explicit Handling Via Indication of Cell Group in the Measurement Configuration

In order to distinguish measurement configurations coming from the MN and SN, one possibility is to include an indication in the different measurement configuration IEs. The ASN.1 code of the IEs and example procedures for this method are shown below UE Aspects
MeasIdToAddModList Information Element

```
-- ASN1START
-- TAG-MEAS-ID-TO-ADD-MOD-LIST-START
MeasIdToAddModList ::=                SEQUENCE (SIZE
    (1..maxNrofMeasId)) OF
MeasIdToAddMod
MeasIdToAddModList-r15xy ::=          SEQUENCE (SIZE
    (1..maxNrofMeasId)) OF
MeasIdToAddMod-r15xy
MeasIdToAddMod ::=                    SEQUENCE {
  measId                                MeasId,
  measObjectId                          MeasObjectId,
  reportConfigId                        ReportConfigId
}
MeasIdToAddMod-r15xy ::=              SEQUENCE {
  measId                                MeasId,
  cellGroup                             CellGroupId OPTIONAL,
  measObjectId                          MeasObjectId,
  reportConfigId                        ReportConfigId
}
-- TAG-MEAS-ID-TO-ADD-MOD-LIST-STOP
-- ASN1STOP
```

MeasObjectToAddModList Information Element

```
-- ASN1START
-- TAG-MEAS-OBJECT-TO-ADD-MOD-LIST-START
MeasObjectToAddModList ::=            SEQUENCE (SIZE
    (1..maxNrofObjectId)) OF
MeasObjectToAddMod
MeasObjectToAddModList-r15xy ::=      SEQUENCE (SIZE
(1..maxNrofObjectId)) OF MeasObjectToAddMod-r15xy
MeasObjectToAddMod ::=                SEQUENCE {
  measObjectId                          MeasObjectId,
  measObject                            CHOICE {
    measObjectNR                          MeasObjectNR,
    ... ,
    measObjectEUTRA                       MeasObjectEUTRA
  }
}
MeasObjectToAddMod-r15xy ::=          SEQUENCE {
  measObjectId                          MeasObjectId,
  cellGroup                             CellGroupId OPTIONAL,
  measObject                            CHOICE {
    measObjectNR                          MeasObjectNR,
    ... ,
    measObjectEUTRA                       MeasObjectEUTRA
  }
}
-- TAG-MEAS-OBJECT-TO-ADD-MOD-LIST-STOP
-- ASN1STOP
```

ReportConfigToAddModList Information Element

```
-- ASN1START
-- TAG-REPORT-CONFIG-TO-ADD-MOD-LIST-START
ReportConfigToAddModList ::=          SEQUENCE (SIZE
    (1..maxReportConfigId)) OF
ReportConfigToAddMod
ReportConfigToAddModList-r15xy ::=    SEQUENCE (SIZE
    (1..maxReportConfigId))
```

```
OF ReportConfigToAddMod-r15xy
ReportConfigToAddMod ::=           SEQUENCE {
    reportConfigId                     ReportConfigId,
    reportConfig                       CHOICE {
        reportConfigNR                     ReportConfigNR,
        ...,
        reportConfigInterRAT               ReportConfig
            InterRAT
    }
}
ReportConfigToAddMod-r15xy ::=     SEQUENCE {
    reportConfigId                     ReportConfigId,
    cellGroup                          CellGroupId OPTIONAL,
    reportConfig                       CHOICE {
        reportConfigNR                     ReportConfigNR,
        ...,
        reportConfigInterRAT               ReportConfig
            InterRAT
    }
}
```

VarMeasConfig UE Variable

```
-- ASN1START
-- TAG-VAR-MEAS-CONFIG-START
VarMeasConfig ::=                  SEQUENCE {
    -- Measurement identities
    measIdList                         MeasIdToAddModList OPTIONAL,
    -- Measurement objects
    measObjectList                     MeasObjectToAddMod
        List OPTIONAL,
    -- Reporting configurations
    reportConfigList                   ReportConfigToAddModList
        OPTIONAL,
    -- Other parameters
    quantityConfig                     QuantityConfig OPTIONAL,
    s-MeasureConfig                    CHOICE {
        ssb-RSRP                           RSRP-Range,
        csi-RSRP                           RSRP-Range
    }                                      OPTIONAL
}
VarMeasConfig- r15xy ::=           SEQUENCE {
    -- Measurement identities
    measIdList                         MeasIdToAddModList-
        r15xy OPTIONAL,
    -- Measurement objects
    measObjectList                     MeasObjectToAddModList-
        r15xy OPTIONAL,
    -- Reporting configurations
    reportConfigList                   ReportConfigToAddModList-
        r15xy OPTIONAL,
    -- Other parameters
    quantityConfig                     QuantityConfig OPTIONAL,
    s-MeasureConfig                    CHOICE {
        ssb-RSRP                           RSRP-Range,
        csi-RSRP                           RSRP-Range
    }                                      OPTIONAL
}
-- TAG-VAR-MEAS-CONFIG-STOP
-- ASN1STOP
```

VarMeasReportList UE Variable

```
-- ASN1START
-- TAG-VAR-MEAS-REPORT-START
VarMeasReportList ::=      SEQUENCE (SIZE
    (1..maxNrofMeasId)) OF VarMeasReport
VarMeasReport::=           SEQUENCE {
    -- List of measurement that have been triggered
    measId                     MeasId,
    cellsTriggeredList         CellsTriggeredList OPTIONAL,
    numberOfReportsSent        INTEGER
}
VarMeasReport-r15xy ::=    SEQUENCE {
    -- List of measurement that have been triggered
    measId                     MeasId-r15xy,
    cellsTriggered List        CellsTriggeredList OPTIONAL,
    numberOfReportsSent        INTEGER
}
CellsTriggeredList ::=     SEQUENCE (SIZE
    (1..maxNrofCellMeas)) OF CHOICE {
    physCellId                 PhysCellId,
    -- Not needed for EN-DC.
    physCellIdEUTRA            ENUMERATED
        {ffsTypeAndValue}
}
-- TAG-VAR-MEAS-REPORT-STOP
-- ASN1STOP
```

Measurement Reporting

General

<<skipped parts>>

1> if the UE is configured with EN-DC:

2> if SRB3 is configured:

3> submit the MeasurementReport message via SRB3 to lower layers for transmission, upon which the procedure ends;

2> else:

3> submit the MeasurementReport message via the EUTRA MCG embedded in E-UTRA RRC message ULInformationTransferMRDC as specified in TS 36.331.

1> else if measID of the measResult included in the MeasurementReport message is associated with the SCG (i.e. cellGroup=1):

2> if SRB3 is configured:

3> submit the MeasurementReport message via SRB3 to lower layers for transmission, upon which the procedure ends;

2> else:

3> submit the MeasurementReport message via the MCG embedded in RRC message ULInformationTransferMRDC.

1> else:

2> submit the MeasurementReport message to lower layers for transmission, upon which the procedure ends.

Network Aspects

The same mechanisms as in the "Network Aspects" section above can be reused to co-ordinate the identities between the MN and SN.

Embodiment d

Explicit Handling Via Separate Configurations for MCG and SCG

The ASN.1 code of the IEs and example procedures for the method where a separate measurement configuration IEs, fields and UE variables are used for configuring/reporting of SCG measurements are shown below.

UE Aspects

RRCReconfiguration Message

```
-- ASN1START
-- TAG-RRCRECONFIGURATION-START
RRCReconfiguration ::=             SEQUENCE {
    rrc-Transaction Identifier         RRC-Transaction Identifier,
    criticalExtensions                 CHOICE {
        rrcReconfiguration                 RRCReconfiguration-IEs,
        criticalExtensionsFuture           SEQUENCE { }
    }
}
```

```
RRCReconfiguration-IEs ::=          SEQUENCE {
    radioBearerConfig                   RadioBearerConfig
OPTIONAL, -- Need M
    secondaryCellGroup                  OCTET STRING
        (CONTAINING CellGroupConfig)
OPTIONAL, -- Need M
    measConfig                          MeasConfig
OPTIONAL, -- Need M
    lateNonCriticalExtension            OCTET STRING
OPTIONAL,
    nonCriticalExtension                RRCReconfiguration-
v1530-IEs
OPTIONAL
}
RRCReconfiguration-v1530-IEs ::=    SEQUENCE {
    masterCellGroup                     OCTET STRING
        (CONTAINING CellGroupConfig)
OPTIONAL, -- Need M
    fullConfig                          ENUMERATED {true}
OPTIONAL, -- Cond FullConfig
    dedicatedNAS-MessageList            SEQUENCE
        (SIZE(1..maxDRB)) OF
DedicatedNAS-Message                    OPTIONAL, -- Cond nonHO
    masterKeyUpdate                     MasterKeyUpdate
OPTIONAL, -- Cond MasterKeyChange
    dedicatedS 161-Delivery             OCTET STRING
        (CONTAINING SIB1)
OPTIONAL, -- Need N
    dedicatedSystemInformationDelivery  OCTET STRING
        (CONTAINING SystemInformation)  OPTIONAL, -- Need N
    otherConfig                         OtherConfig
OPTIONAL, -- Need N
    nonCriticalExtension                RRCReconfiguration-
v15xy-IEs
OPTIONAL
}
OPTIONAL, -- Need N
    nonCriticalExtension                RRCReconfiguration-
v15xy-IEs
OPTIONAL
}
RRCReconfiguration-v15xy-IEs ::=    SEQUENCE {
    mrdc-SecondaryCellGroup             CHOICE {
        nr-SCG                              OCTET STRING,
        eutra-SCG                           OCTET STRING
    }
OPTIONAL, -- Need M
    radioBearerConfig2                  OCTET STRING
        (CONTAINING RadioBearerConfig)
OPTIONAL, -- Need M
    sk-Counter                          INTEGER (0..65535)
OPTIONAL, -- Cond S-KeyChange
    nonCriticalExtension                RRCReconfiguration-
v15xxx-IEs
OPTIONAL
}
RRCReconfiguration-y15xxx-IEs ::=   SEQUENCE {
    measConfig-SCG                      MeasConfig
OPTIONAL, -- Need M
    nonCriticalExtension                RRCReconfiguration-
v15xxx-IEs
OPTIONAL
}
VarMeasConfig-SCG ::= VarMeasConfig
VarMeasReportLIst-SCG ::= VarMeasReportList
-- TAG-RRCRECONFIGURATION-STOP
-- ASN1START
-- TAG-RRCRECONFIGURATION-START
RRCReconfiguration ::=              SEQUENCE {
    rrc-Transaction Identifier          RRC-Transaction Identifier,
    criticalExtensions                  CHOICE {
        rrcReconfiguration                  RRCReconfiguration-
IEs,
        criticalExtensionsFuture            SEQUENCE { }
    }
}
RRCReconfiguration-IEs ::=          SEQUENCE {
    radioBearerConfig                   RadioBearerConfig
OPTIONAL, -- Need M
    secondaryCellGroup                  OCTET STRING
        (CONTAINING
CellGroupConfig)                    OPTIONAL, -- Need M
    measConfig                          MeasConfig
OPTIONAL, -- Need M
    lateNonCriticalExtension            OCTET STRING
OPTIONAL,
    nonCriticalExtension                RRCReconfiguration-
v1530-IEs
OPTIONAL
}
RRCReconfiguration-v1530-IEs ::=    SEQUENCE {
    masterCellGroup                     OCTET STRING
        (CONTAINING CellGroupConfig)
OPTIONAL, -- Need M
    fullConfig                          ENUMERATED {true}
OPTIONAL, Cond FullConfig
    dedicatedNAS-MessageList            SEQUENCE
        (SIZE(1..maxDRB)) OF
DedicatedNAS-Message                    OPTIONAL, Cond nonHO
    masterKeyUpdate                     MasterKeyUpdate
OPTIONAL, Cond MasterKeyChange
    dedicatedS 161-Delivery             OCTET STRING
        (CONTAINING SIB1)
OPTIONAL, -- Need N
    dedicatedSystemInformationDelivery  OCTET
STRING (CONTAINING
SystemInformation)                  OPTIONAL, -- Need N
    otherConfig                         OtherConfig
```

Reception of an RRCReconfiguration by the UE

The UE shall perform the following actions upon reception of the RRCReconfiguration:

<<skipped parts>>

1> if the RRCReconfiguration message includes the measConfig:

2> perform the measurement configuration procedure as specified in 5.5.2;

1> if the RRCReconfiguration message includes the measConfig-SCG:

2> perform the measurement configuration procedure as specified in 5.5.2;

<<skipped parts>>

General

The network applies the procedure as follows:

to ensure that, whenever the UE has a measConfig, it includes a measObject for the SpCell and for each NR SCell to be measured;

to configure at most one measurement identity using a reporting configuration with the reportType set to reportCGI;

to ensure that, for all SSB based reporting configurations have at most one measurement object with the same ssbFrequency and ssbSubcarrierSpacing;

The UE shall:

1> if the received measConfig or measConfig-SCG includes the measObjectToRemoveList:

2> perform the measurement object removal procedure as specified in 5.5.2.4;

1> if the received measConfig or measConfig-SCG includes the measObjectToAddModList:

2> perform the measurement object addition/modification procedure as specified in 5.5.2.5;

1> if the received measConfig or measConfig-SCG includes the reportConfigToRemoveList:

2> perform the reporting configuration removal procedure as specified in 5.5.2.6;

1> if the received measConfig or measConfig-SCG includes the reportConfigToAddModList:

2> perform the reporting configuration addition/modification procedure as specified in 5.5.2.7;
1> if the received measConfig or measConfig-SCG includes the quantityConfig:
2> perform the quantity configuration procedure as specified in 5.5.2.8;
1> if the received measConfig or measConfig-SCG includes the measIdToRemoveList:
2> perform the measurement identity removal procedure as specified in 5.5.2.2;
1> if the received measConfig or measConfig-SCG includes the measIdToAddModList:
2> perform the measurement identity addition/modification procedure as specified in 5.5.2.3;
1> if the received measConfig includes the measGapConfig:
2> perform the measurement gap configuration procedure as specified in 5.5.2.9;
1> if the received measConfig includes the measGapSharingConfig:
2> perform the measurement gap sharing configuration procedure as specified in 5.5.2.11;
1> if the received measConfig or measConfig-SCG includes the s-MeasureConfig:
2> if s-MeasureConfig is set to ssb-RSRP, set parameter ssb-RSRP of s-MeasureConfig within VarMeasConfig to the lowest value of the RSRP ranges indicated by the received value of s-MeasureConfig;
2> else, set parameter csi-RSRP of s-MeasureConfig within VarMeasConfig to the lowest value of the RSRP ranges indicated by the received value of s-MeasureConfig.

NOTE: In NR-DC, the measurement gap and gap sharing configuration is performed by the MN, for both FR1 and FR2 frequencies. Thus, the measConfig-SCG does not contain the measGapConfig and the measGapSharingConfig IEs.

5.5.2.2 Measurement Identity Removal

The UE shall:
1> if this procedure is called due to a reception of a measConfig:
2> for each measId included in the received measIdToRemoveList that is part of the current UE configuration in VarMeasConfig:
3> remove the entry with the matching measId from the measIdList within the VarMeasConfig;
3> remove the measurement reporting entry for this measId from the VarMeasReportList, if included;
3> stop the periodical reporting timer if running and reset the associated information (e.g. timeToTrigger) for this measId.

NOTE: The UE does not consider the message as erroneous if the measIdToRemoveList includes any measId value that is not part of the current UE configuration.

1> else if this procedure is called due to a reception of a measConfig-SCG:
2> for each measId included in the received measIdToRemoveList that is part of the current UE configuration in VarMeasConfig-SCG:
3> remove the entry with the matching measId from the measIdList within the VarMeasConfig-SCG;
3> remove the measurement reporting entry for this measId from the VarMeasReportList-SCG, if included;
3> stop the periodical reporting timer if running and reset the associated information (e.g. timeToTrigger) for this measId.

NOTE: The UE does not consider the message as erroneous if the measIdToRemoveList includes any measId value that is not part of the current UE configuration.

5.5.2.3 Measurement Identity Addition/Modification

The network applies the procedure as follows:
configure a measId only if the corresponding measurement object, the corresponding reporting configuration and the corresponding quantity configuration, are configured.

The UE shall:
1> if this procedure is called due to a reception of a measConfig:
2> for each measId included in the received measIdToAddModList:
3> if an entry with the matching measId exists in the measIdList within the VarMeasConfig:
4> replace the entry with the value received for this measId;
3> else:
4> add a new entry for this measId within the VarMeasConfig;
3> remove the measurement reporting entry for this measId from the VarMeasReportList, if included;
3> stop the periodical reporting timer and reset the associated information (e.g. timeToTrigger) for this measId.
3> if the reportType is set to reportCGI in the reportConfig associated with this measId;
4> if the measObject associated with this measId concerns E-UTRA:
5> start timer T321 with the timer value set to X seconds for this measId;
4> if the measObject associated with this measId concerns NR:
5> start timer T321 with the timer value set to Y seconds for this measId;
1> if this procedure is called due to a reception of a measConfig-SCG:
2> for each measId included in the received measIdToAddModList:
3> if an entry with the matching measId exists in the measIdList within the VarMeasConfig-SCG:
4> replace the entry with the value received for this measId;
3> else:
4> add a new entry for this measId within the VarMeasConfig-SCG;
3> remove the measurement reporting entry for this measId from the VarMeasReportList-SCG, if included;
3> stop the periodical reporting timer and reset the associated information (e.g. timeToTrigger) for this measId.
3> if the reportType is set to reportCGI in the reportConfig associated with this measId;
4> if the measObject associated with this measId concerns E-UTRA:
5> start timer T321 with the timer value set to X seconds for this measId;
4> if the measObject associated with this measId concerns NR:
5> start timer T321 with the timer value set to Y seconds for this measId;

The other measurement configuration procedures in 38.331 such as 5.5.2.4 (Measurement object removal), 5.5.2.5 (Measurement object addition/modification), 5.5.2.6 (Reporting configuration removal), 5.5.2.7 (Reporting configuration addition/modification), etc, are also modified in the same way above to consider the SCG measurement configuration)

Performing Measurements

General

<<skipped parts>>

The UE shall:
1> whenever the UE has a measConfig or measConfig-SCG, perform RSRP and RSRQ measurements for each serving cell for which servingCellMO is configured as follows:
  2> if at least one measId included in the measIdList within VarMeasConfig or VarMeasConfig-SCG contains an rsType set to ssb:
    3> if at least one measId included in the measIdList within VarMeasConfig or VarMeasConfig-SCG contains a reportQuantityRsIndexes and maxNrofRSIndexesToReport:
      4> derive layer 3 filtered RSRP and RSRQ per beam for the serving cell based on SS/PBCH block, as described in 5.5.3.3a;
    3> derive serving cell measurement results based on SS/PBCH block, as described in 5.5.3.3;
  2> if at least one measId included in the measIdList within VarMeasConfig or VarMeasConfig-SCG contains an rsType set to csi-rs:
    3> if at least one measId included in the measIdList within VarMeasConfig or VarMeasConfig-SCG contains a reportQuantityRsIndexes and maxNrofRSIndexesToReport:
      4> derive layer 3 filtered RSRP and RSRQ per beam for the serving cell based on CSI-RS, as described in 5.5.3.3a;
    3> derive serving cell measurement results based on CSI-RS, as described in 5.5.3.3;
1> if at least one measId included in the measIdList within VarMeasConfig or VarMeasConfig-SCG contains SINR as trigger quantity and/or reporting quantity:
  2> if the associated reportConfig contains rsType set to ssb:
    3> if the measId contains a reportQuantityRsIndexes and maxNrofRSIndexesToReport:
      4> derive layer 3 filtered SINR per beam for the serving cell based on SS/PBCH block, as described in 5.5.3.3a;
    3> derive serving cell SINR based on SS/PBCH block, as described in 5.5.3.3;
  2> if the associated reportConfig contains rsType set to csi-rs:
    3> if the measId contains a reportQuantityRsIndexes and maxNrofRSIndexesToReport:
      4> derive layer 3 filtered SINR per beam for the serving cell based on CSI-RS, as described in 5.5.3.3a;
    3> derive serving cell SINR based on CSI-RS, as described in 5.5.3.3;
1> for each measId included in the measIdList within VarMeasConfig or VarMeasConfig-SCG:
  2> if the reportType for the associated reportConfig is set to reportCGI:
    3> perform the corresponding measurements on the frequency and RAT indicated in the associated measObject using available idle periods;
    3> if the cell indicated by reportCGI field for the associated measObject is an NR cell and that indicated cell is broadcasting SIB1 (see TS 38.213, section 13):
      4> try to acquire SIB1 in the concerned cell;
    3> if the cell indicated by reportCGI field is an EUTRA cell:
      4> try to acquire SystemInformationBlockType1 in the concerned cell;
  2> if the reportType for the associated reportConfig is periodical or eventTriggered:
    3> if a measurement gap configuration is setup, or
    3> if the UE does not require measurement gaps to perform the concerned measurements:
      4> if s-MeasureConfig is not configured, or
      4> if s-MeasureConfig is set to ssb-RSRP and the NR SpCell RSRP based on SS/PBCH block, after layer 3 filtering, is lower than ssb-RSRP, or
      4> if s-MeasureConfig is set to csi-RSRP and the NR SpCell RSRP based on CSI-RS, after layer 3 filtering, is lower than csi-RSRP:
        5> if the measObject is associated to NR and the rsType is set to csi-rs:
          6> if reportQuantityRsIndexes and maxNrofRSIndexesToReport for the associated reportConfig are configured:
            7> derive layer 3 filtered beam measurements only based on CSI-RS for each measurement quantity indicated in reportQuantityRsIndexes, as described in 5.5.3.3a;
          6> derive cell measurement results based on CSI-RS for each trigger quantity and each measurement quantity indicated in reportQuantityCell using parameters from the associated measObject, as described in 5.5.3.3;
        5> if the measObject is associated to NR and the rsType is set to ssb:
          6> if reportQuantityRsIndexes and maxNrofRSIndexesToReport for the associated reportConfig are configured:
            7> derive layer 3 beam measurements only based on SS/PBCH block for each measurement quantity indicated in reportQuantityRsIndexes, as described in 5.5.3.3a;
          6> derive cell measurement results based on SS/PBCH block for each trigger quantity and each measurement quantity indicated in reportQuantityCell using parameters from the associated measObject, as described in 5.5.3.3;
        5> if the measObject is associated to E-UTRA:
          6> perform the corresponding measurements associated to neighbouring cells on the frequencies indicated in the concerned measObject;
  2> perform the evaluation of reporting criteria as specified in 5.5.4.

Measurement Report Triggering

General

If security has been activated successfully, the UE shall:
1> for each measId included in the measIdList within VarMeasConfig or VarMeasConfig-SCG:
  2> if the corresponding reportConfigincludes a reportType set to eventTriggered or periodical;
    3> if the corresponding measObject concerns NR;
      4> if the eventA1 or eventA2 is configured in the corresponding reportConfig:
        5> consider only the serving cell to be applicable;
      4> else:
        5> for events involving a serving cell associated with a measObjectNRand neighbours associated with another measObjectNR, consider any serving cell associated with the other measObjectNR to be a neighbouring cell as well;
        5> if useWhiteCellList is set to TRUE:
          6> consider any neighbouring cell detected based on parameters in the associated measObjectNRto be applicable when the concerned cell is included in the white-CellsToAddModList defined within the VarMeasConfig for this measId;
5> else:
6> consider any neighbouring cell detected based on parameters in the associated measObjectNRto be applicable when the concerned cell is not included in the blackCellsToAddModList defined within the VarMeasConfig for this measId;
3> else if the corresponding measObject concerns E-UTRA;
4> consider any neighbouring cell detected on the associated frequency to be applicable when the concerned cell is not included in the blackCellsToAddModListEUTRAN defined within the VarMeasConfig or VarMeasConfig-SCG for this measId;
2> if the corresponding reportConfig includes a reportType set to reportCGI:
3> consider the cell detected on the associated measObject which has a physical cell identity matching the value of the cellForWhichToReportCGI included in the corresponding reportConfig within the VarMeasConfig or VarMeasConfig-SCG to be applicable;
2> if the reportType is set to eventTriggered and if the entry condition applicable for this event, i.e. the event corresponding with the eventId of the corresponding reportConfig within VarMeasConfig or VarMeasConfig-SCG, is fulfilled for one or more applicable cells for all measurements after layer 3 filtering taken during timeToTrigger defined for this event within the VarMeasConfig or VarMeasConfig-SCG, while the VarMeasReportList or VarMeasReportList-SCG does not include a measurement reporting entry for this measId (a first cell triggers the event):
3> include a measurement reporting entry within the VarMeasReportList or VarMeasReportList-SCG for this measId;
3> set the numberOfReportsSent defined within the VarMeasReportList or VarMeasReportList-SCG for this measId to 0;
3> include the concerned cell(s) in the cellsTriggeredList defined within the VarMeasReportList or VarMeasReportList-SCG for this measId;
3> initiate the measurement reporting procedure, as specified in 5.5.5;
2> if the reportType is set to eventTriggered and if the entry condition applicable for this event, i.e. the event corresponding with the eventId of the corresponding reportConfig within VarMeasConfig or VarMeasConfig-SCG, is fulfilled for one or more applicable cells not included in the cellsTriggeredList for all measurements after layer 3 filtering taken during timeToTrigger defined for this event within the VarMeasConfig (a subsequent cell triggers the event):
3> set the numberOfReportsSent defined within the VarMeasReportList or VarMeasReportList-SCG for this measId to 0;
3> include the concerned cell(s) in the cellsTriggeredList defined within the VarMeasReportList or VarMeasReportList-SCG for this measId;
3> initiate the measurement reporting procedure, as specified in 5.5.5;
2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig or VarMeasConfig-SCG for this event:
3> remove the concerned cell(s) in the cellsTriggeredList defined within the VarMeasReportList or VarMeasReportList-SCG for this measId;
3> if reportOnLeave is set to TRUE for the corresponding reporting configuration:
4> initiate the measurement reporting procedure, as specified in 5.5.5;
3> if the cellsTriggeredList defined within the VarMeasReportList or VarMeasReportList-SCG for this measId is empty:
4> remove the measurement reporting entry within the VarMeasReportList or VarMeasReportList-SCG for this measId;
4> stop the periodical reporting timer for this measId, if running;
2> if reportType is set to periodical and if a (first) measurement result is available:
3> include a measurement reporting entry within the VarMeasReportList or VarMeasReportList-SCG for this measId;
3> set the numberOfReportsSent defined within the VarMeasReportList or VarMeasReportList-SCG for this measId to 0;
4> if the reportAmount exceeds 1:
5> initiate the measurement reporting procedure, as specified in 5.5.5, immediately after the quantity to be reported becomes available for the NR SpCell;
4> else (i.e. the reportAmount is equal to 1):
5> initiate the measurement reporting procedure, as specified in 5.5.5, immediately after the quantity to be reported becomes available for the NR SpCell and for the strongest cell among the applicable cells;
2> upon expiry of the periodical reporting timer for this measId:
3> initiate the measurement reporting procedure, as specified in 5.5.5.
2> if reportType is set to reportCGI;
3> if the UE acquired the SIB1 or SystemInformationBlockType1 for the requested cell; or
3> if the UE detects that the requested NR cell is not transmitting SIB1 (see TS 38.213, section 13):
4> stop timer T321;
4> include a measurement reporting entry within the VarMeasReportList or VarMeasReportList-SCG for this measId;
4> set the numberOfReportsSent defined within the VarMeasReportList or VarMeasReportList-SCG for this measId to 0;
4> initiate the measurement reporting procedure, as specified in 5.5.5;
2> upon the expiry of T321 for this measId:
3> include a measurement reporting entry within the VarMeasReportList or VarMeasReportList-SCG for this measId;
3> set the numberOfReportsSent defined within the VarMeasReportList or VarMeasReportList-SCG for this measId to 0;
3> initiate the measurement reporting procedure, as specified in 5.5.5.

Measurement Reporting
General

The purpose of this procedure is to transfer measurement results from the UE to the network. The UE shall initiate this procedure only after successful security activation. For the measId for which the measurement reporting procedure was triggered, the UE shall set the measResults within the MeasurementReport message as follows:
  1> set the measId to the measurement identity that triggered the measurement reporting;
  <<skipped parts>>
  1> if there is at least one applicable neighbouring cell to report:
    2> set the measResultNeighCells to include the best neighbouring cells up to maxReportCells in accordance with the following:
      3> if the reportType is set to eventTriggered:
        4> include the cells included in the cellsTriggeredList as defined within the VarMeasReportList or VarMeasReportList-SCG for this measId;
      3> else:
        4> include the applicable cells for which the new measurement results became available since the last periodical reporting or since the measurement was initiated or reset;
      4> if reportQuantityRsIndexesand maxNrofRSIndexesToReport are configured, include beam measurement information as described in 5.5.5.2;
  <<skipped parts>>
  1> increment the numberOfReportsSent as defined within the VarMeasReportList or VarMeasReportList-SCG for this measId by 1;
  1> stop the periodical reporting timer, if running;
  1> if the numberOfReportsSent as defined within the VarMeasReportList or VarMeasReportList-SCG for this measId is less than the reportAmount as defined within the corresponding reportConfig for this measId:
    2> start the periodical reporting timer with the value of reportInterval as defined within the corresponding reportConfig for this measId;
  1> else:
    2> if the reportType is set to periodical:
      3> remove the entry within the VarMeasReportList or VarMeasReportList-SCG for this measId;
      3> remove this measId from the measIdList within VarMeasConfig or VarMeasConfig-SCG;
  1> if the UE is configured with EN-DC or NGEN-DC:
    2> if SRB3 is configured:
      3> submit the MeasurementReport message via SRB3 to lower layers for transmission, upon which the procedure ends;
    2> else:
      3> submit the MeasurementReport message via the EUTRA MCG embedded in E-UTRA RRC message ULInformationTransferMRDC as specified in TS 36.331.
    (The difference from EN_DC is that in EN-DC measConfig was used for secondary configuration, while in NR-DC, measConfig-SCG and the like were used for the primary configuration.)
  1> else if the measurement report is triggered based on SCG measurement configuration:
    2> if SRB3 is configured:
      3> submit the MeasurementReport message via SRB3 to lower layers for transmission, upon which the procedure ends;
    2> else:
      3> submit the MeasurementReport message via the MCG embedded in RRC message ULInformationTransferMRDC.
  1> else:
    2> submit the MeasurementReport message to lower layers for transmission, upon which the procedure ends.

Network Aspects

Since there are two separate measurement configurations signalled from the MN and SN, measurement/reporting configuration identities can be reused across cell groups without creating confusion at the UE. As such, there is no necessity for the co-ordination of identities between the MN and SN. However, the network may use similar mechanisms as in the earlier embodiments to enable co-ordination between the MN and SN can be considered (e.g. possibility to reuse the same measurement object in both the MN and SN configuration, rather than use different ones, if the configuration of the two measurement objects were exactly the same)

Figure 6:
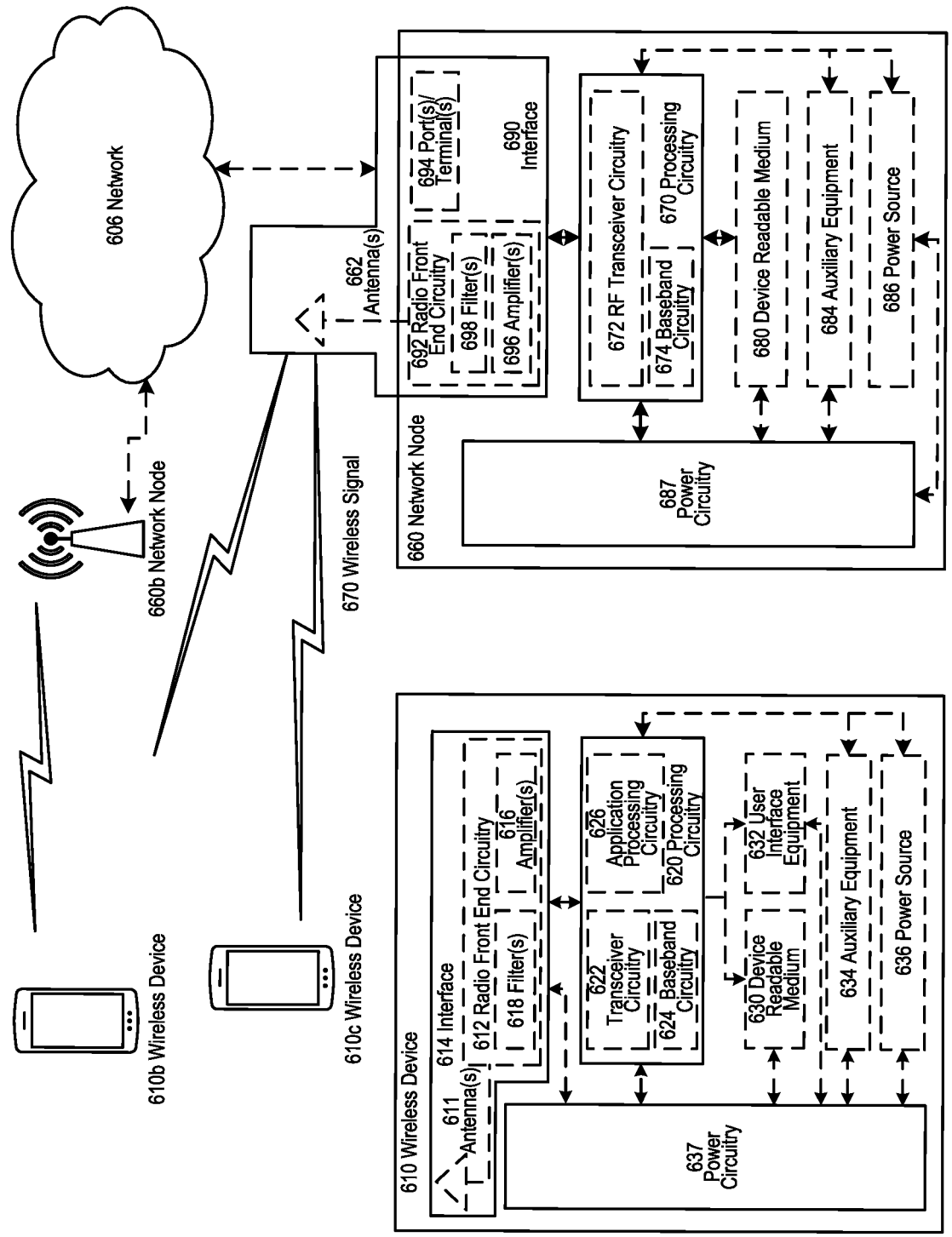
FIG. 6 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components. In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment. Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination. Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario. Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
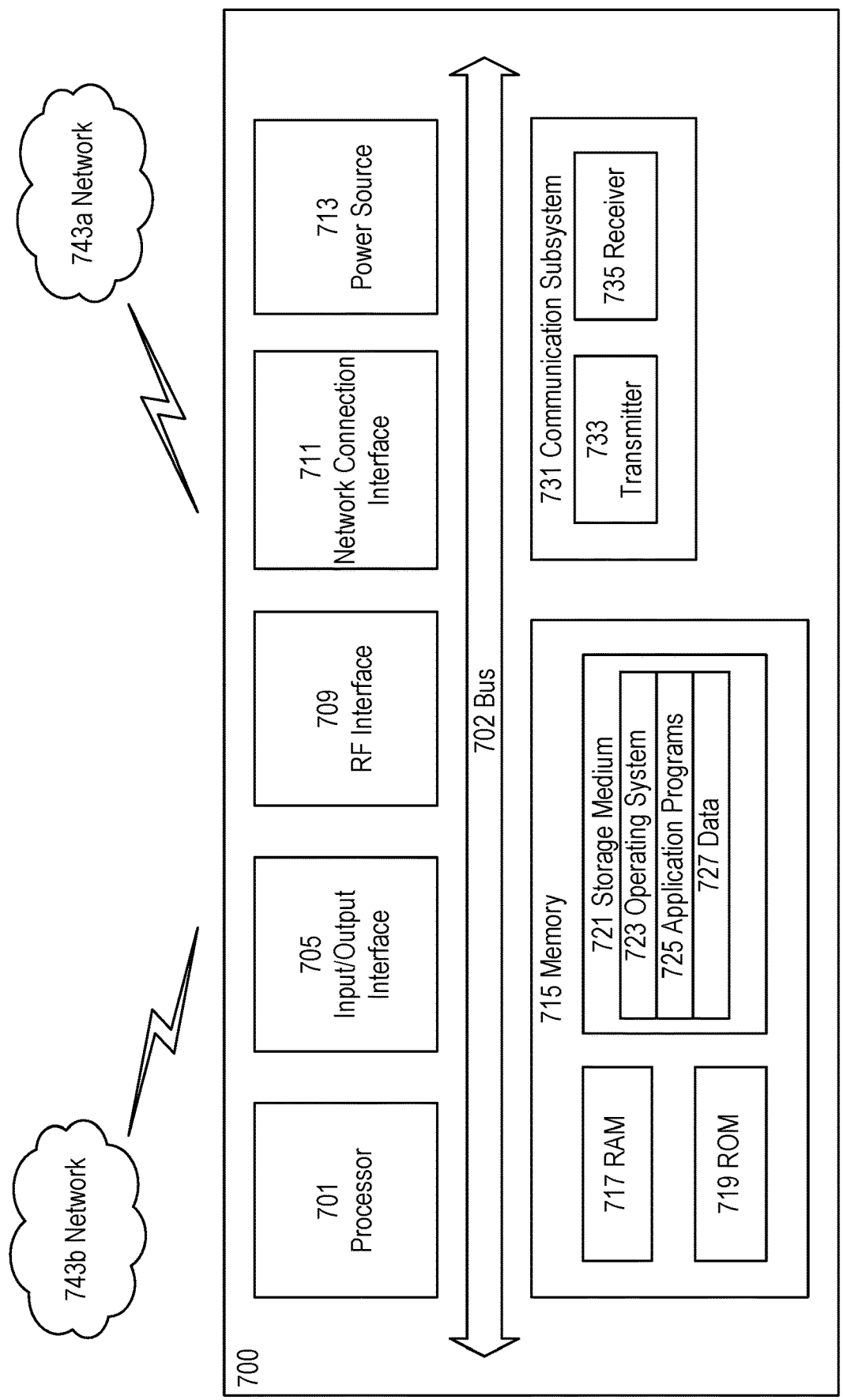
FIG. 7 shows a User Equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the 3rd Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium. In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
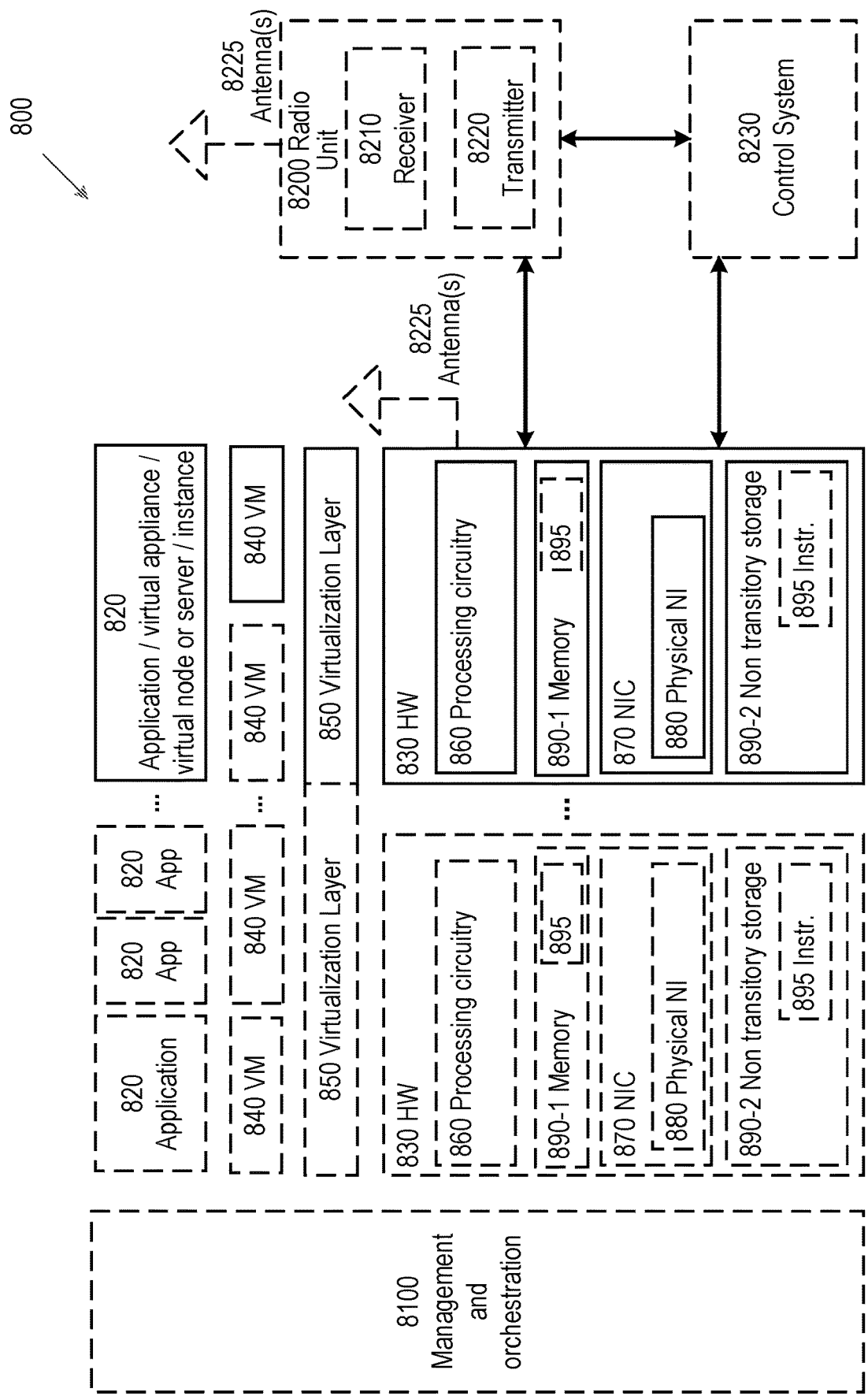
FIG. 8 shows a virtualization environment in accordance with some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein. Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8. In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
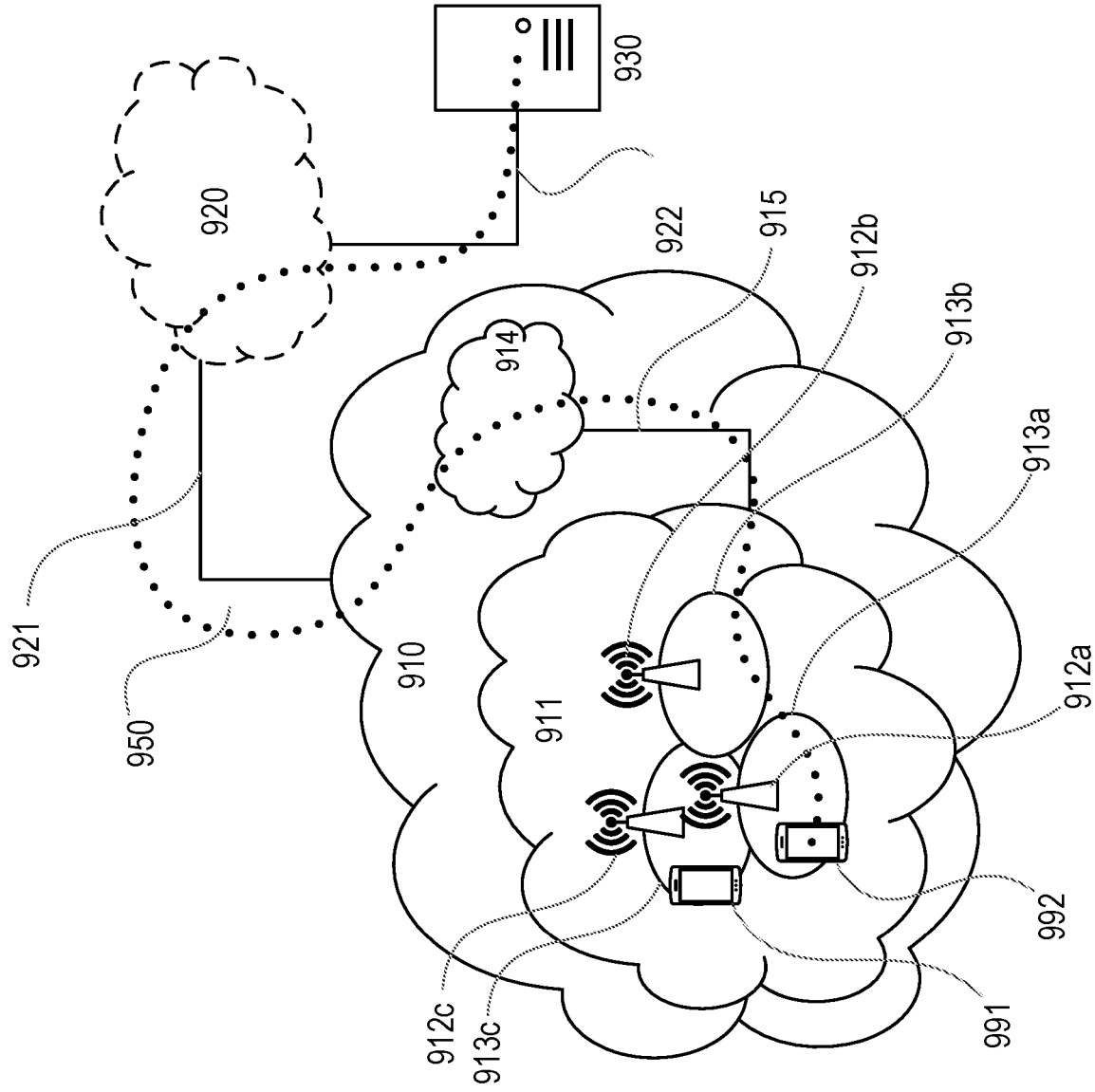
FIG. 9 shows the connection of a telecommunication network via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912. Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides. It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

Figure 10:
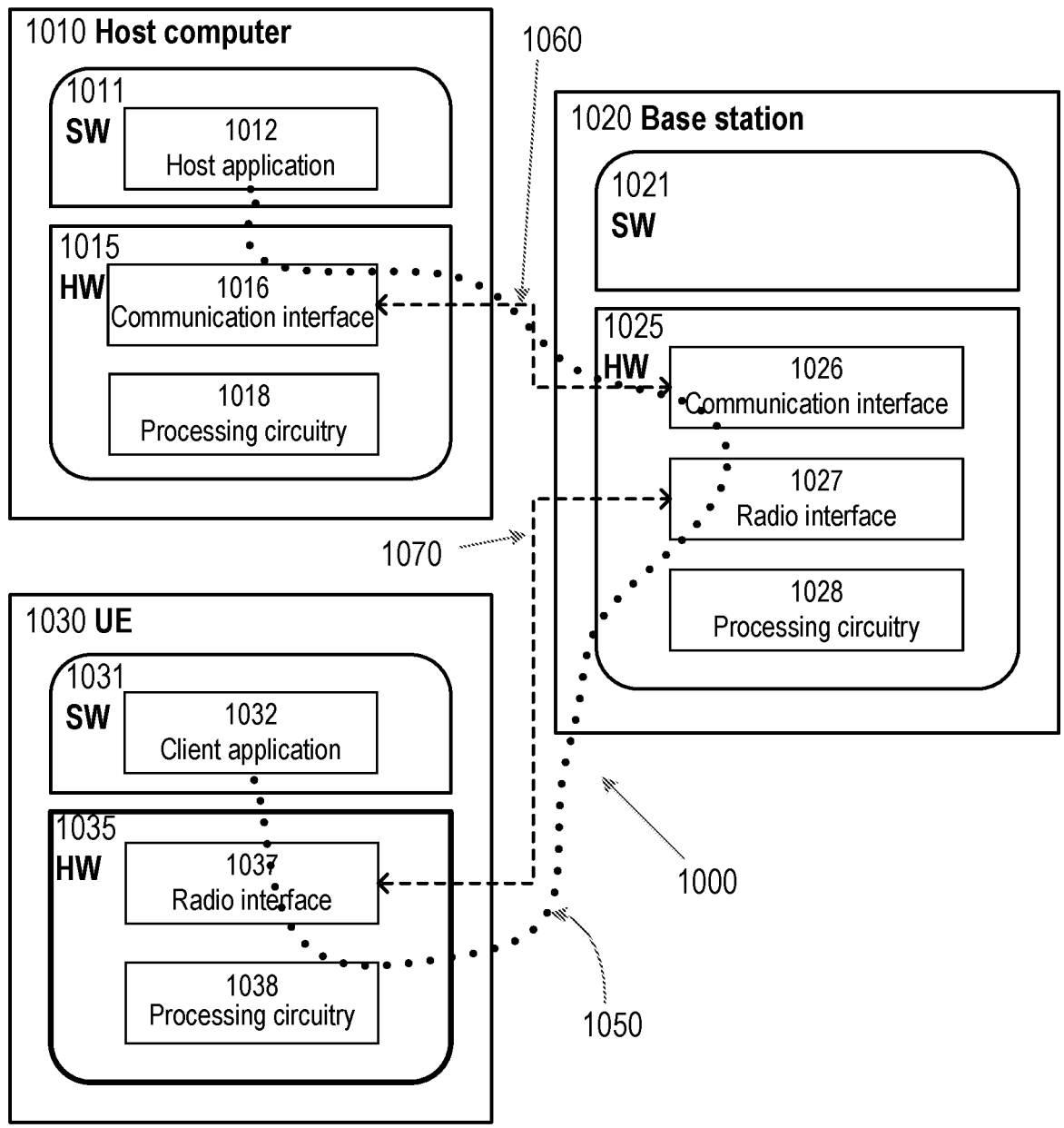
FIG. 10 shows a host computer communicating via a base station with a user equipment over a partially wireless connection in accordance with some embodiments.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network). Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the achievable data rate and power consumption, and thereby provide benefits such as reduced use waiting time and extended battery lifetime.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
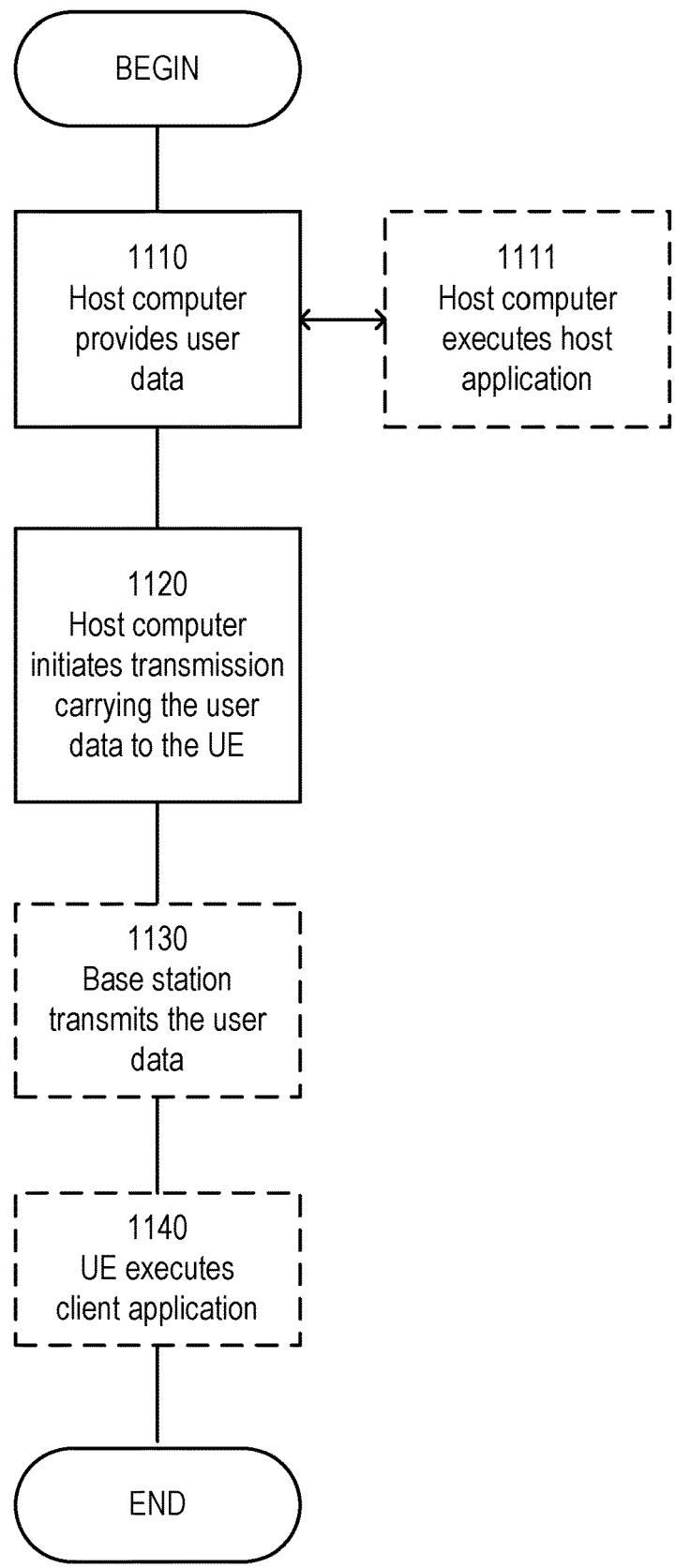
FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
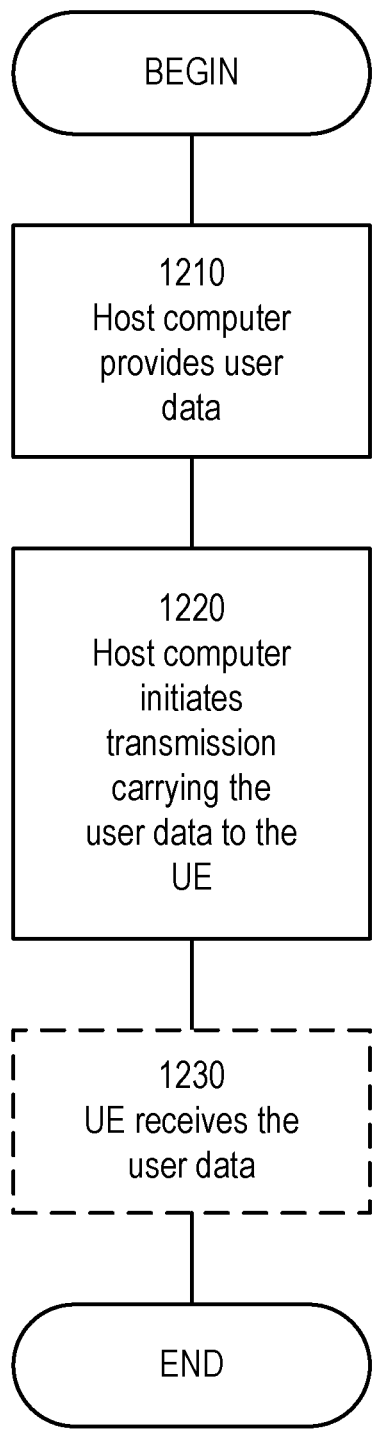
FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
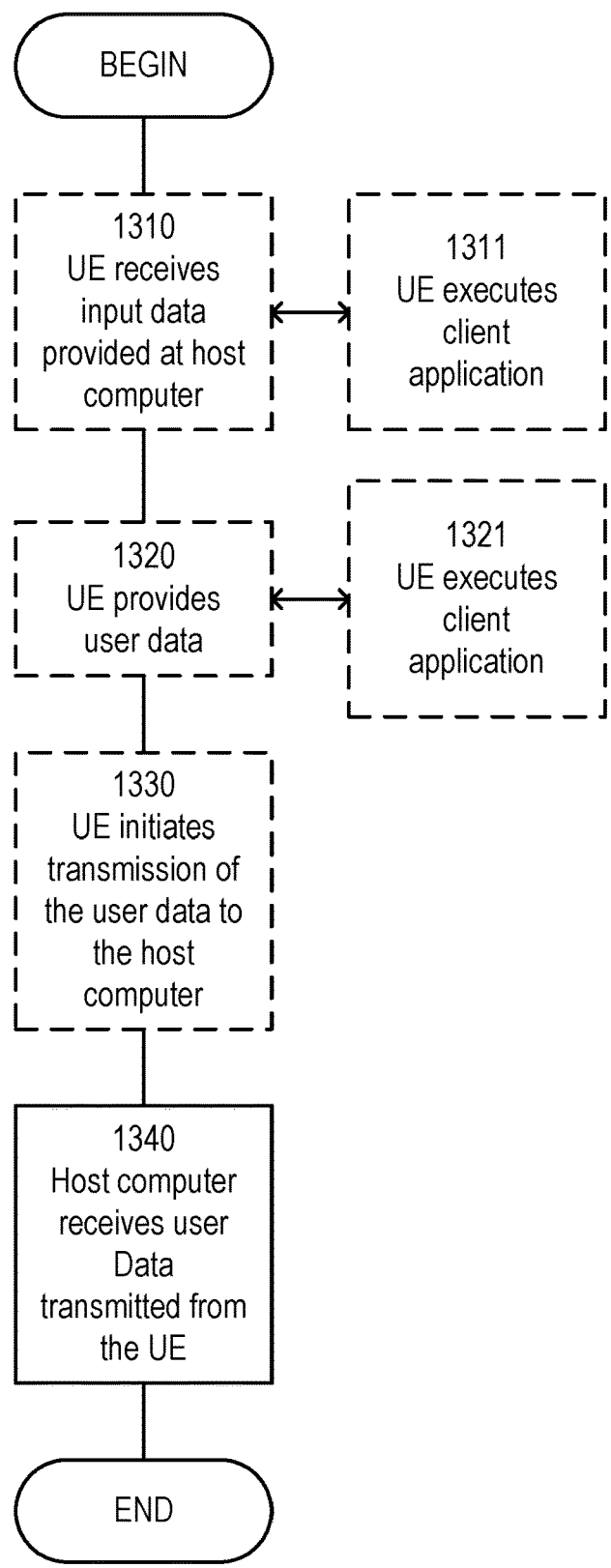
FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
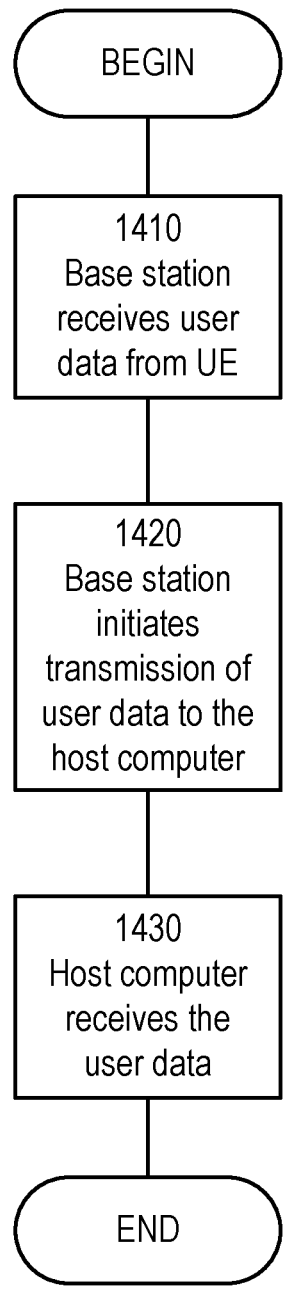
FIG. 14 shows methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
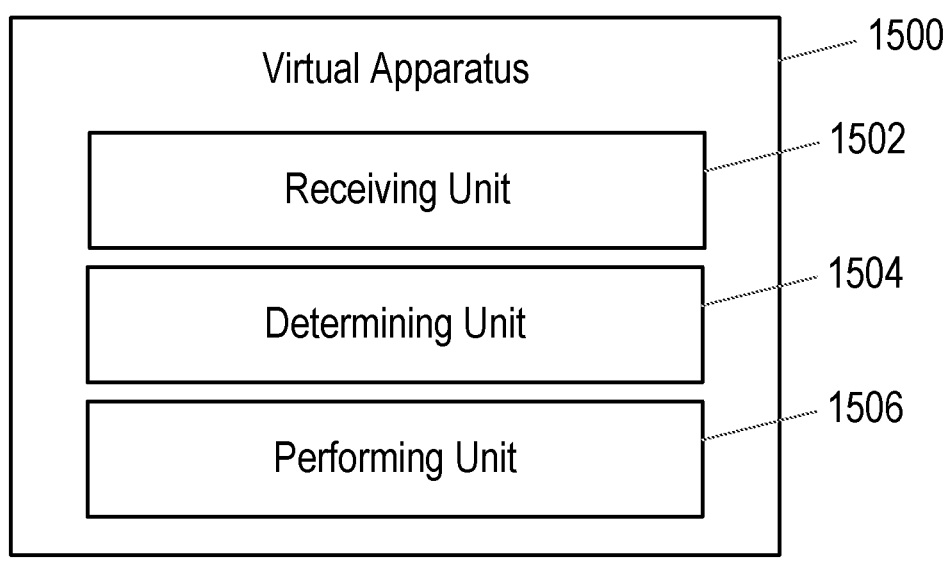
FIG. 15 illustrates a virtualization apparatus in accordance with some embodiments.

FIG. 15 illustrates a schematic block diagram of an apparatus 1500 in a wireless network (for example, the wireless network shown in FIG. 6). The apparatus may be implemented in a wireless device or network node (e.g., wireless device 610 or network node 660 shown in FIG. 6). Apparatus 1500 is operable to carry out the example method described with reference to FIG. 4 and possibly any other processes or methods disclosed herein. It is also to be understood that the method of FIG. 4 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, determining unit 1504, and performing unit 1506, and any other suitable units of apparatus 1500 to perform corresponding functions according one or more embodiments of the present disclosure. As illustrated in FIG. 15, apparatus 1500 includes receiving unit 1502, determining unit 1504, and performing unit 1506, and, when a UE is operating with dual connectivity to a first network node and a second network node, and the first network node and the second network node are both New Radio, NR, nodes, the receiving unit 1502 is configured for receiving measurement and/or reporting configuration information from a network; the determining unit 1504 is configured for determining at the UE, based on the received measurement and/or reporting configuration information, whether the received measurement and/or reporting configuration information relates to the first network node or the second network node; and the performing unit 1506 is configured for performing measurements and/or reporting measurement results based on the determination as to whether the received measurement and/or reporting configuration information relates to the first network node or the second network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, wherein the wireless device is operating with dual connectivity to a Master node and a Secondary node, and wherein the Master node and the Secondary node are both New Radio (NR) nodes, the method comprising:
receiving measurement and/or reporting configuration information from a network;
determining, at the wireless device and based on the received measurement and/or reporting configuration information, whether the received measurement and/or reporting configuration information relates to a Master Cell Group or a Secondary Cell Group, wherein the determining whether the received measurement and/or reporting configuration information relates to the Master Cell Group or the Secondary Cell Group comprises:
determining that the received measurement and/or reporting configuration information relates to the Master Cell Group if the measurement and/or reporting configuration information is received directly within an RRCReconfiguration message received via Signal Radio Bearer 1 (SRB1); or
determining that the received measurement and/or reporting configuration information relates to the Secondary Cell Group if the measurement and/or reporting configuration information is received directly within an RRCReconfiguration message received via Signal Radio Bearer 3 (SRB3), or if the measurement and/or reporting configuration information is received in an RRCReconfiguration message that is embedded within an RRCReconfiguration message received via SRB1; and
performing measurements and/or reporting measurement results based on the determination as to whether the received measurement and/or reporting configuration information relates to the Master Cell Group or the Secondary Cell Group.

2. The method of claim 1, wherein the method comprises reporting measurement results to either the Master node or the Secondary node based on the determination as to whether received reporting configuration information relates to the Master Cell Group or the Secondary Cell Group.

3. The method of claim 1, wherein the method comprises receiving a configuration information from the network indicating a range of one or more of measurement identities, measurement object identities, and/or reporting configuration that are to be associated with the Secondary Cell Group.

4. The method of claim 1, wherein the received measurement and/or reporting configuration comprises:
first information elements and/or fields containing measurement and/or reporting configuration information relating to the Master Cell Group; and/or second information elements and/or fields containing measurement and/or reporting configuration information relating to the Secondary Cell Group.

5. The method of claim 1, wherein the method comprises reporting measurement results information relating to the Master Cell Group in first information elements and/or fields, or reporting measurement results relating to the Secondary Cell Group in second information elements different from the first information elements.

6. The method of claim 5, wherein the method comprises, if SRB3 is configured, reporting measurement results relating to the Secondary Cell Group via SRB3.

7. The method of claim 5, wherein the method comprises, if SRB3 is not configured, reporting measurement results relating to the Secondary Cell Group in a Radio Resource Control message via the Master Cell Group.

8. A wireless device, wherein the wireless device is operating with dual connectivity to a Master node and a Secondary node, and wherein the Master node and the Secondary node are both New Radio (NR) nodes, the wireless device comprising:
  processing circuitry;
  memory containing instructions executable by the processing circuitry whereby the wireless device is operative to:
    receive measurement and/or reporting configuration information from a network;
    determine, at the wireless device and based on the received measurement and/or reporting configuration information, whether the received measurement and/or reporting configuration information relates to a Master Cell Group or a Secondary Cell Group, wherein the determining whether the received measurement and/or reporting configuration information relates to the Master Cell Group or the Secondary Cell Group comprises:
      determining that the received measurement and/or reporting configuration information relates to the Master Cell Group if the measurement and/or reporting configuration information is received directly within an RRCReconfiguration message received via Signal Radio Bearer 1 (SRB1); or
      determining that the received measurement and/or reporting configuration information relates to the Secondary Cell Group if the measurement and/or reporting configuration information is received directly within an RRCReconfiguration message received via Signal Radio Bearer 3 (SRB3), or if the measurement and/or reporting configuration information is received in an RRCReconfiguration message that is embedded within an RRCReconfiguration message received via SRB1; and
    perform measurements and/or reporting measurement results based on the determination as to whether the received measurement and/or reporting configuration information relates to the Master Cell Group or the Secondary Cell Group; and
  power supply circuitry configured to supply power to the processing circuitry.

9. The wireless device of claim 8, wherein the instructions are such that the wireless device is operative to report measurement results to either the Master node or the Secondary node based on the determination as to whether received reporting configuration information relates to the Master Cell Group or the Secondary Cell Group.

10. The wireless device of claim 8, wherein the instructions are such that the wireless device is operative to receive a configuration information from the network indicating a range of one or more of measurement identities, measurement object identities, and/or reporting configuration that are to be associated with the Secondary Cell Group.

11. The wireless device of claim 8, wherein the received measurement and/or reporting configuration comprises:
  first information elements and/or fields containing measurement and/or reporting configuration information relating to the Master Cell Group; and/or
  second information elements and/or fields containing measurement and/or reporting configuration information relating to the Secondary Cell Group.

12. The wireless device of claim 8, wherein the instructions are such that the wireless device is operative to report measurement results information relating to the Master Cell Group in first information elements and/or fields, or report measurement results relating to the Secondary Cell Group in second information elements different from the first information elements.

13. The wireless device of claim 12, wherein the instructions are such that the wireless device is operative to report, if SRB3 is configured, measurement results relating to the Secondary Cell Group via SRB3.

14. The wireless device of claim 12, wherein the instructions are such that the wireless device is operative to report, if SRB3 is not configured, measurement results relating to the Secondary Cell Group in a Radio Resource Control message via the Master Cell Group.

* * * * *

UNITED STATES PATENT AND TRADEMARK OFFICE
CERTIFICATE OF CORRECTION

| | | |
|---|---|---|
| PATENT NO. | : 12,063,536 B2 | Page 1 of 2 |
| APPLICATION NO. | : 17/289809 | |
| DATED | : August 13, 2024 | |
| INVENTOR(S) | : Teyeb et al. | |

It is certified that error appears in the above-identified patent and that said Letters Patent is hereby corrected as shown below:

In the Specification

In Columns 5 & 6, in Table, Line 31, delete "dedicatedSSIB1-Delivery" and insert -- dedicatedSIB1-Delivery --, therefor.

In Columns 7 & 8, in Table, Line 50, delete "CandidateServingFregListNR" and insert -- CandidateServingFreqListNR --, therefor.

In Column 28, Line 59, delete "etc. . . . )," and insert -- etc.), --, therefor.

In Column 45, Line 23, delete "dedicatedS 161-Delivery" and insert -- dedicatedSIB1-Delivery --, therefor.

In Column 45, Line 60, delete "Cond" and insert -- -- Cond --, therefor.

In Column 45, Line 61, delete "dedicatedS 161-Delivery" and insert -- dedicatedSIB1-Delivery --, therefor.

In Column 57, Lines 62-63, delete "radio front end circuitry 690" and insert -- radio front end circuitry 692 --, therefor.

In Column 59, Lines 64-65, delete "Radio front end circuitry 614" and insert -- Radio front end circuitry 612 --, therefor.

In Column 62, Line 48, delete "interchangeable." and insert -- interchangeably. --, therefor.

In Column 65, Lines 58-59, delete "memory 890. Memory 890" and insert -- memory 890-1. Memory 890-1 --, therefor.

In Column 72, Line 32, delete "Carrier Component" and insert -- Component Carrier --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,063,536 B2

In Column 72, Line 34, delete "Code Division Multiplexing Access" and insert -- Code-Division Multiple Access --, therefor.

In Column 72, Line 35, delete "Cell Global Identifier" and insert -- Cell Global Identity --, therefor.

In Column 72, Line 41, delete "information" and insert -- indicator --, therefor.

In Column 73, Line 29, delete "Profile Delay Profile" and insert -- Power Delay Profile --, therefor.

In Column 73, Line 34, delete "Precoder Matrix Indicator" and insert -- Precoding Matrix Indicator --, therefor.

In Column 73, Line 44, delete "Radio Link Management" and insert -- Radio Link Monitoring --, therefor.

In Column 73, Line 65, delete "Self Optimized Network" and insert -- Self-Organizing Network --, therefor.

In Column 74, Line 13, delete "Wide CDMA" and insert -- Wideband CDMA --, therefor.

In Column 74, Line 14, delete "Wide Local Area Network" and insert -- Wireless Local Area Network --, therefor.